(12) United States Patent
Yamamoto

(10) Patent No.: US 12,017,628 B2
(45) Date of Patent: Jun. 25, 2024

(54) BRAKE CONTROL DEVICE FOR VEHICLE

(71) Applicant: ADVICS CO., LTD., Kariya (JP)

(72) Inventor: Yusaku Yamamoto, Tokai (JP)

(73) Assignee: ADVICS CO., LTD., Kariya (JP)

( * ) Notice: Subject to any disclaimer, the term of this patent is extended or adjusted under 35 U.S.C. 154(b) by 742 days.

(21) Appl. No.: 16/981,165

(22) PCT Filed: Mar. 8, 2019

(86) PCT No.: PCT/JP2019/009471
§ 371 (c)(1),
(2) Date: Sep. 15, 2020

(87) PCT Pub. No.: WO2019/188143
PCT Pub. Date: Oct. 3, 2019

(65) Prior Publication Data
US 2021/0114569 A1 Apr. 22, 2021

(30) Foreign Application Priority Data
Mar. 30, 2018 (JP) ................................. 2018-066806

(51) Int. Cl.
*B60T 8/00* (2006.01)
*B60T 7/12* (2006.01)
(Continued)

(52) U.S. Cl.
CPC ............. *B60T 8/1755* (2013.01); *B60T 7/12* (2013.01); *B60W 10/18* (2013.01); *B60W 40/11* (2013.01);
(Continued)

(58) Field of Classification Search
None
See application file for complete search history.

(56) References Cited

U.S. PATENT DOCUMENTS 8,046,130 B2 * 10/2011 Takahara .............. B60T 8/1766
701/79
2010/0168975 A1 * 7/2010 Takahara .............. B60T 8/1766
701/70
(Continued)

FOREIGN PATENT DOCUMENTS

EP 3037309 A1 6/2016
JP 2017109664 A 6/2017
WO 2015177985 A1 11/2015

OTHER PUBLICATIONS

International Search Report (PCT/ISA/210) dated Jun. 11, 2019, by the Japanese Patent Office as the International Searching Authority for International Application No. PCT/JP2019/009471.
(Continued)

*Primary Examiner* — Truc M Do
(74) *Attorney, Agent, or Firm* — BUCHANAN INGERSOLL & ROONEY PC

(57) ABSTRACT

A brake control device is applied to a brake device that controls a front-wheel braking force and a rear-wheel braking force. The brake control device includes a ratio calculation circuit that calculates a target front and rear braking force distribution ratio based on a target pitch angle, and a brake control circuit that performs a stability control by operating the brake device based on the target front and rear braking force distribution ratio during braking.

9 Claims, 8 Drawing Sheets

(51) Int. Cl.
*B60T 8/1755* (2006.01)
*B60W 10/18* (2012.01)
*B60W 40/11* (2012.01)
*B60T 8/26* (2006.01)

(52) U.S. Cl.
CPC ............ *B60T 8/26* (2013.01); *B60T 2230/04* (2013.01); *B60T 2260/06* (2013.01); *B60T 2270/608* (2013.01)

(56) References Cited

U.S. PATENT DOCUMENTS

| | | |
|---|---|---|
| 2013/0006476 A1 | 1/2013 | Yamazaki |
| 2013/0245888 A1 | 9/2013 | Kikuchi et al. |
| 2019/0106110 A1* | 4/2019 | Yoshida .................... B60L 7/26 |
| 2019/0299949 A1* | 10/2019 | Ying ..................... B60T 8/1761 |

OTHER PUBLICATIONS

Written Opinion (PCT/ISA/237) dated Jun. 11, 2019, by the Japanese Patent Office as the International Searching Authority for International Application No. PCT/JP2019/009471.

* cited by examiner

BRAKE CONTROL DEVICE FOR VEHICLE

TECHNICAL FIELD

The present disclosure relates to a brake control device for a vehicle that controls a pitch angle of the vehicle during braking.

BACKGROUND ART

Patent Literature 1 describes an example of a device that changes a front and rear braking force distribution ratio to increase the rear-wheel braking force when a traveling attitude of the vehicle becomes a predetermined traveling attitude during braking. The front and rear braking force distribution ratio in this document is a ratio of the rear-wheel braking force with respect to the front-wheel braking force, The rear-wheel braking force is the braking force applied to the rear wheels, and the front-wheel braking force is the braking force applied to the front wheels.

CITATIONS LIST

Patent Literature

Patent Literature 1: Japanese Unexamined Patent Publication No. 2017-109664

SUMMARY OF INVENTION

Technical Problems

In the device described in Patent Literature 1, the front and rear braking force distribution ratio is changed so that a vehicle is tilted backward (e.g., in a nose lift) if an attitude of the vehicle has a predetermined attitude during traveling. This means that the vehicle that has been tilted forward (e.g., in a nose dive or in a nose down) due to deceleration begins to be tilted backward by changing the front and rear braking force distribution ratio. In this case, a time lag occurs from when change of the front and rear braking force distribution ratio is inputted to when the ratio is actually changed and the vehicle begins to be tilted backward. As a result, the pitch angle of the vehicle may fluctuate during braking.

Solutions to Problems

A brake control device for a vehicle for solving the above problems is applied to a brake device configured to adjust a front-wheel braking force that is a braking force for front wheels of a vehicle, and a rear-wheel braking force that is a braking force for rear wheels of the vehicle. The brake control device includes, a ratio calculation circuit that calculates a target front and rear braking force distribution ratio that is a target value of the front and rear braking force distribution ratio based on the target pitch angle, the target value of a pitch angle of the vehicle during braking is a target pitch angle, and a ratio of the rear-wheel braking force with respect to the front-wheel braking force is a front and rear braking force distribution ratio; and a brake control circuit that performs a stability control by operating the brake device based on the target front and rear braking force distribution ratio during braking.

In the above configuration, the brake device is operated from when braking starts as the stability control. That is, from when braking starts, the front-wheel braking force and the rear-wheel braking force are adjusted so that the actual front and rear braking force distribution ratio becomes the target front and rear braking force distribution ratio. The target front and rear braking force distribution ratio is a ratio based on the target pitch angle. Therefore, compared with a case where the adjustment of the front-wheel braking force and the rear-wheel braking force based on the target front and rear braking force distribution ratio is started after the pitch angle of the vehicle deviates from the target pitch angle, the fluctuation of the pitch angle of the vehicle during braking can be prevented.

The front and rear braking force distribution ratio is the ratio of the rear-wheel braking force with respect to the front-wheel braking force. Therefore, an increase of the front and rear braking force distribution ratio indicates a decrease of the distribution ratio of the braking force to the front wheels and an increase of the distribution ratio of the braking force to the rear wheels larger. On the contrary, a decrease of the front and rear braking force distribution ratio indicates an increase of the distribution ratio of the braking force to the front wheels and a decrease of the distribution ratio of the braking force to the rear wheels.

DESCRIPTION OF EMBODIMENT

Hereinafter, one embodiment of a brake control device for a vehicle will be described with reference to FIGS. 1 to 12.

Figure 1:
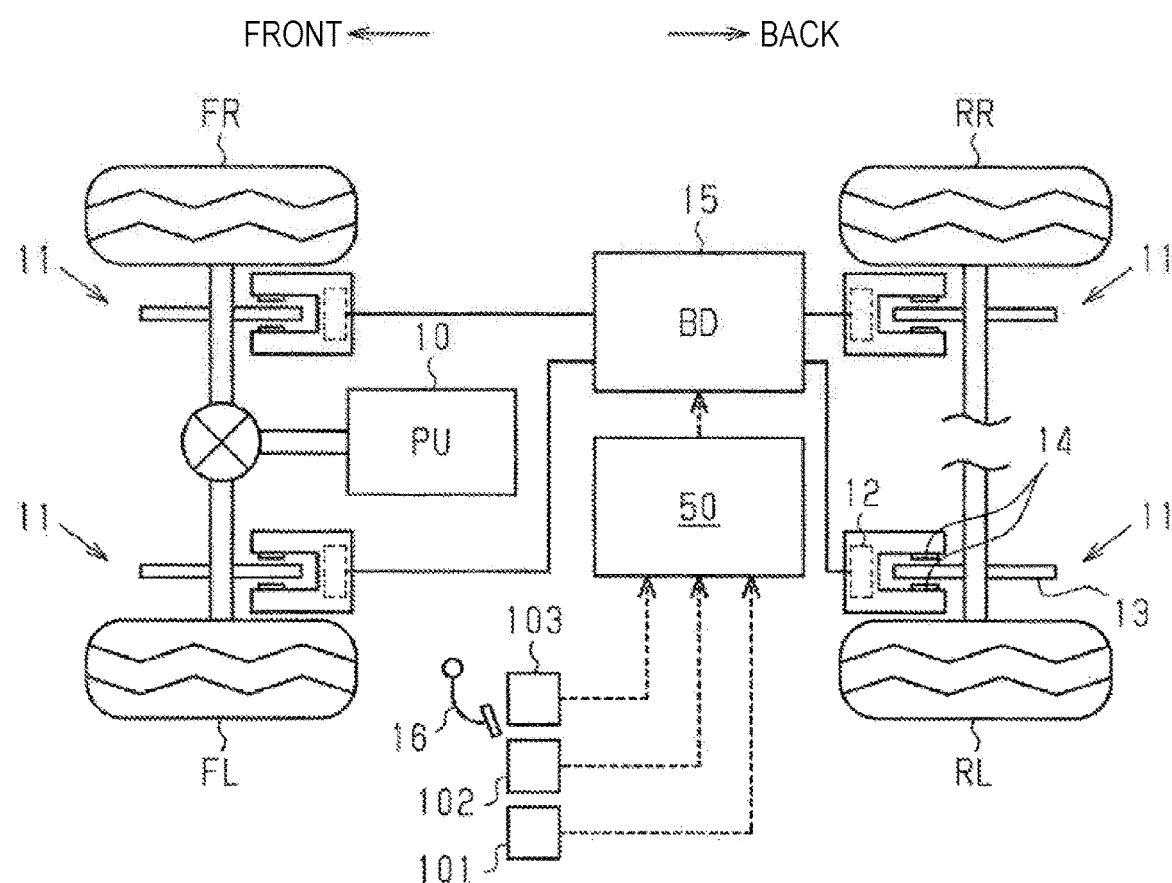
FIG. 1 is a configuration view showing an outline of a vehicle including a brake control device of an embodiment.

FIG. 1 illustrates a vehicle equipped with a brake control device 50 according to the present embodiment. The vehicle is provided with a power circuit 10 having a power source such as an engine and an electric motor. The vehicle shown in FIG. 1 is a front-wheel drive vehicle. Therefore, the driving force output from the power circuit 10 is transmitted to the front wheels FL, FR of the wheels FL, FR, RL, RR. The vehicle equipped with the brake control device 50 may be a rear-wheel drive vehicle or a four-wheel drive vehicle.

The vehicle is provided with a plurality of braking mechanisms 11 provided for the wheels FL, FR, RL, RR, and a brake device 15 that controls the operation of each braking mechanism 11. Each braking mechanism 11 includes a wheel cylinder 12 to which brake fluid is supplied, a rotating body 13 that rotates integrally with the wheels FL, FR, RL, RR, and a friction material 14 that relatively moves in a direction of moving toward and moving away from the rotating body 13. Then, in each braking mechanism 11, the force for pressing the friction material 14 against the rotating body 13 increases as the WC pressure Pwc, which is the fluid pressure in the wheel cylinder 12, becomes higher. Thus, braking force corresponding to the force for pressing the friction material 14 against the rotating body 13 is applied to the wheels FL, FR, RL, RR. The braking force applied to the front wheels FL, FR by the operation of the braking mechanism 11 is referred to as the "front-wheel braking force BPf", and the braking force applied to the rear wheels RL, RR by the operation of the braking mechanism 11 is referred to as the "rear-wheel braking force BPr."

When a brake operation member 16 such as a brake pedal is operated by the driver of the vehicle, the WC pressure Pwc in each wheel cylinder 12, that is, the front-wheel braking force BPf and the rear-wheel braking force BPr are increased so that the deceleration of the vehicle increases as the braking operation amount X increases. In the present embodiment, the WC pressure Pwc in each wheel cylinder 12, that is, the front-wheel braking force BPf and the rear-wheel braking force BPr, is adjusted so that a pitch angle PA of the vehicle becomes a target pitch angle PATr by controlling the brake device 15 by the brake control device 50.

The vehicle including the brake control device 50 has an automatic traveling function. Even at the time of automatic braking during automatic traveling of the vehicle based on the automatic traveling function, the WC pressure Pwc in each wheel cylinder 12, that is, the front-wheel braking force BPf and the rear-wheel braking force BPr are adjusted so that the pitch angle PA of the vehicle becomes the target pitch angle PATr.

Figure 2:
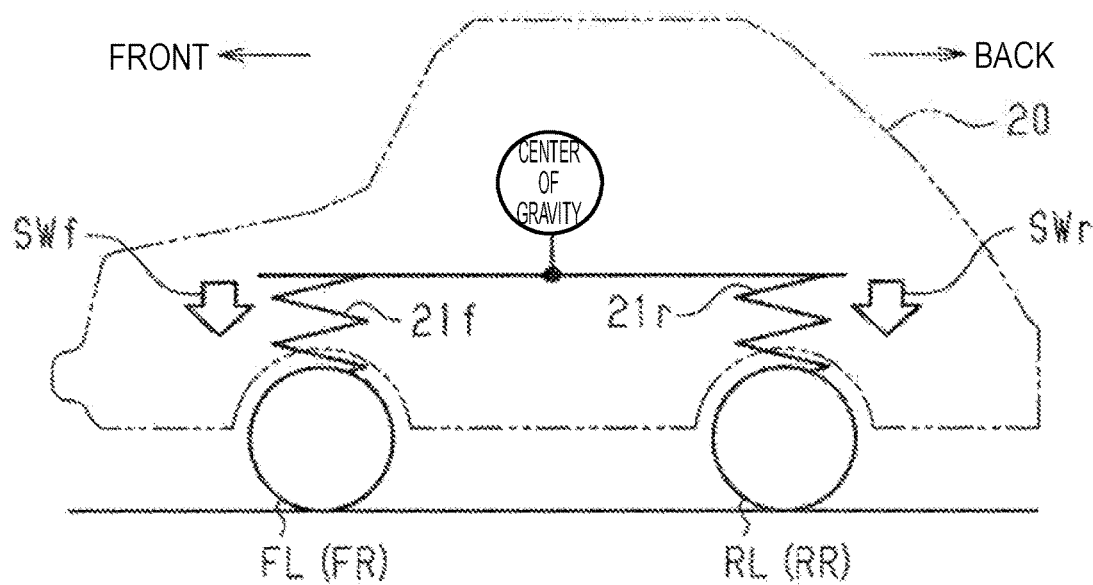
FIG. 2 is a schematic view showing a state in which a pitching moment is not generated in the vehicle.
Figure 3:
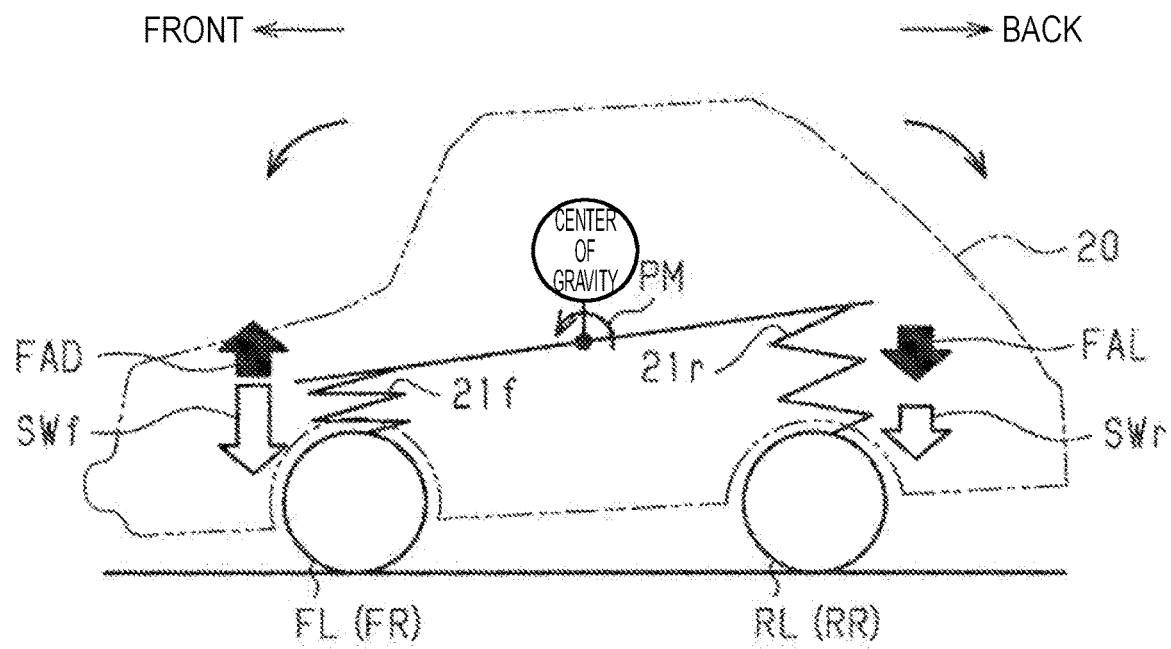
FIG. 3 is a schematic view showing a state in which a pitching moment is generated in the vehicle.

Next, pitching of the vehicle during braking will be described with reference to FIGS. 2 and 3. FIG. 2 shows a vehicle 20 when a longitudinal acceleration of the vehicle 20 is "0" such as when the vehicle is stopped or when the vehicle is traveling at a constant speed. On the other hand, FIG. 3 shows the vehicle 20 during braking. Note that in FIGS. 2 and 3, the sprung load SWf on the front wheel side and the sprung load SWr on the rear wheel side are represented by white arrows. The sprung load is a load in a vertical direction input to the suspension from the vehicle body by the vehicle weight and the pitching moment. Furthermore, of the sprung loads, the load input to springs 21f and 21r of the suspension, that is, the load that the springs 21f and 21r bear is referred to as the "spring load". The load in the vertical direction on the road surface of the wheel is referred to as the "ground contact load of the wheel".

As shown in FIG. 2, when the longitudinal acceleration Gx of the vehicle 20 is "0", the length of the front wheel spring 21f forming the suspension for the front wheel is held at the length in which the sprung load SWf on the front wheel side and the reaction force of the front wheel spring 21f are balanced. Similarly, the length of the rear wheel spring 21r forming the suspension for the rear wheel is held at the length in which the sprung load SWr on the rear wheel side and the reaction force of the rear wheel spring 21r are balanced. When neither the braking force nor the driving force is applied to the vehicle, that is, when the vehicle is traveling by inertia, both the anti-dive force and the anti-lift force are not generated in the vehicle. Furthermore, in such a case, no pitching moment is generated due to acceleration/deceleration of the vehicle. Therefore, the sprung loads SWf and SWr from the vehicle body due to the vehicle weight become the spring loads.

When the vehicle is decelerated by the application of the braking force to the vehicle 20, a pitching moment PM as indicated by a solid arrow in FIG. 3 is generated in the vehicle 20, and the vehicle 20 may tilted forward. (e.g., in a nose dive.) The nose dive is a behavior of the vehicle in which the front portion of the vehicle 20 is displaced downward and the rear portion of the vehicle 20 is displaced upward. On the other hand, the behavior of the vehicle in which the front portion of the vehicle 20 is displaced upward and the rear portion of the vehicle 20 is displaced downward is referred to as "nose lift".

In the vehicle 20 including the brake control device 50, the geometries of the suspension for the front wheel and the suspension for the rear wheel are set to satisfy the following two conditions. (Condition 1) A braking force is applied to the front wheels FL, FR, and an anti-dive force FAD that is a force in a direction of separating the front portion of the vehicle away from the front wheels FL, FR, that is, a direction of pushing up the front portion of the vehicle upward is generated. (Condition 2) A braking force is applied to the rear wheels RL, RR, and an anti-lift force FAL which is a force in a direction of approaching the rear portion of the vehicle closer to the rear wheels RL, RR, that is, a direction of pushing down the rear portion of the vehicle downward is generated.

In FIG. 3, the anti-dive force FAD and the anti-lift force FAL are represented by black arrows. The relationship between the anti-dive force FAD and the front-wheel braking force BPf is determined by the specifications of the vehicle, where the absolute value of the anti-dive force FAD increases as the front-wheel braking force BPf increases. Furthermore, the relationship between the anti-lift force FAL and the rear-wheel braking force BPr is determined by the specifications of the vehicle, where the anti-lift force FAL increases as the rear-wheel braking force BPr increases When both the anti-dive force FAD and the anti-lift force FAL are generated, the spring load on the front wheel side, which is the spring load input to the front wheel spring 21f, becomes the sum of the sprung load SWf on the front wheel side and the anti-dive force FAD. Furthermore, the spring load on the rear wheel side, which is the spring load input to the rear wheel spring 21r, is the sum of the sprung load SWr on the rear wheel side and the anti-lift force FAL. The length of the front wheel spring 21f during vehicle braking is a length in which the spring load on the front wheel side and the reaction force of the front wheel spring 21f are balanced. As shown in FIG. 3, the direction of the anti-dive force FAD is opposite to the direction of the sprung load SWf on the front wheel side. Furthermore, the length of the rear wheel spring 21r during vehicle braking is a length in which the spring load on the rear wheel side and the reaction force of the rear wheel spring 21r are balanced. As shown in FIG. 3, the direction of the anti-lift force FAL is the same as the direction of the sprung load SWr of the rear wheel. When braking force is generated in both the front wheels FL, FR and the rear wheels RL, RR, the vehicle decelerates, and a pitching moment PM corresponding to the deceleration of the vehicle at this time is generated in the vehicle. When braking forces of the same magnitude are generated in the front wheels FL, FR and the rear wheels RL, RR, in a typical vehicle, the anti-lift force FAL generated on the rear wheels RL, RR side becomes larger than the anti-dive force FAD generated on the front wheels FL, FR side. Alternatively, when braking forces of the same magnitude are generated in the front wheels FL, FR and the rear wheels RL, RR, the reduction amount of the length of the rear wheel spring 21*r* by the anti-lift force FAL generated on the rear wheels RL, RR side becomes larger than the increase amount of the length of the front wheel spring 21*f* by the anti-dive force FAD generated on the front wheels FL, FR side. Therefore, even if the total sum of the braking forces for each wheel FL, FR, RL, RR is the same, the contraction amount of the rear wheel spring 21*r* involved in vehicle braking increases as the rear-wheel braking force BPr increases and the anti-lift force FAL increases, and consequently, the pitch angle PA to backward of the vehicle tends to increase.

That is, assuming the ratio of the rear-wheel braking force BPr with respect to the front-wheel braking force BPf is the front and rear braking force distribution ratio DR (=BPr/BPf), the pitch angle PA of the vehicle is an angle corresponding to the front and rear braking force distribution ratio DR during braking. Specifically, as the front and rear braking force distribution ratio DR decreases, the distribution of the braking force to the front wheels FL, FR increases, and therefore, the ratio of the total force combining the anti-dive force FAD and the anti-lift force FAL with respect to the total sum of the braking forces applied to each of the wheels FL, FR, RL, RR decreases. As a result, the pitch angle PA of the vehicle indicates that the vehicle is in the nose dive. On the other hand, as the front and rear braking force distribution ratio DR increases, the distribution of the braking force to the rear wheels RL, RR increases, and therefore, the ratio of the total force combining the anti-dive force FAD and the anti-lift force FAL with respect to the total sum of the braking forces applied to each of the wheels FL, FR, RL, RR increases. As a result, the pitch angle PA of the vehicle indicates that the vehicle is in the nose lift.

Assume that a target value of the pitch angle during braking is a target pitch angle PATr, and the front and rear braking force distribution ratio DR corresponding to the target pitch angle PATr is a target front and rear braking force distribution ratio DRTr. In this case, the pitch angle PA of the vehicle during braking may approach to the target pitch angle PATr by calculating the target front and rear braking force distribution ratio DRTr and controlling the front-wheel braking force BPf and the rear-wheel braking force BPr based on this target front and rear braking force distribution ratio DRTr. The "front and rear braking force distribution ratio DR" referred to in the present embodiment is the ratio of the sum of the rear-wheel braking force BPr applied to the left rear wheel RL and the rear-wheel braking force BPr applied to the right rear wheel RR with respect to the sum of the front-wheel braking force BPf applied to the left front wheel FL and the front-wheel braking force BPf applied to the right front wheel FR.

Next, the brake control device 50 will be described with reference to FIGS. 1 and 4.

As shown in FIG. 1, the brake control device 50 receives signals from various sensors such as a wheel speed sensor 101, a longitudinal acceleration sensor 102, and a stroke sensor 103, which are the same in number as the wheels FL, FR, RL, and RR. The wheel speed sensor 101 detects the wheel speed VW that is the rotation speed of the corresponding wheel, and outputs a signal corresponding to the wheel speed VW. The longitudinal acceleration sensor 102 detects a longitudinal acceleration Gx which is the acceleration in the longitudinal direction of the vehicle, and outputs a signal corresponding to the longitudinal acceleration Gx. The stroke sensor 103 detects a braking operation amount X which is an operation amount of the brake operation member 16, and outputs a signal corresponding to the braking operation amount X. Then, the brake control device 50 controls the brake device 15 based on the signals input from the various sensors 101 to 103.

The brake control device 50 calculates various parameters necessary for performing the braking control. That is, the brake control device 50 calculates the wheel deceleration DVW by time-differentiating the wheel speed VW calculated based on the output signal of the wheel speed sensor 101 and inverting the positive/negative sign of the result of the time differentiation. Furthermore, the brake control device 50 calculates the vehicle body speed VS of the vehicle based on the wheel speed VW of each wheel FL, FR, RL, RR. Moreover, the brake control device 50 calculates the vehicle body deceleration DVS of the vehicle by time differentiating the calculated vehicle body speed VS and inverting the positive/negative sign of the result of the time differentiation. In addition, the brake control device 50 calculates a gradient θ of the road surface on which the vehicle travels based on the longitudinal acceleration Gx and the vehicle body deceleration DVS.

Figure 4:
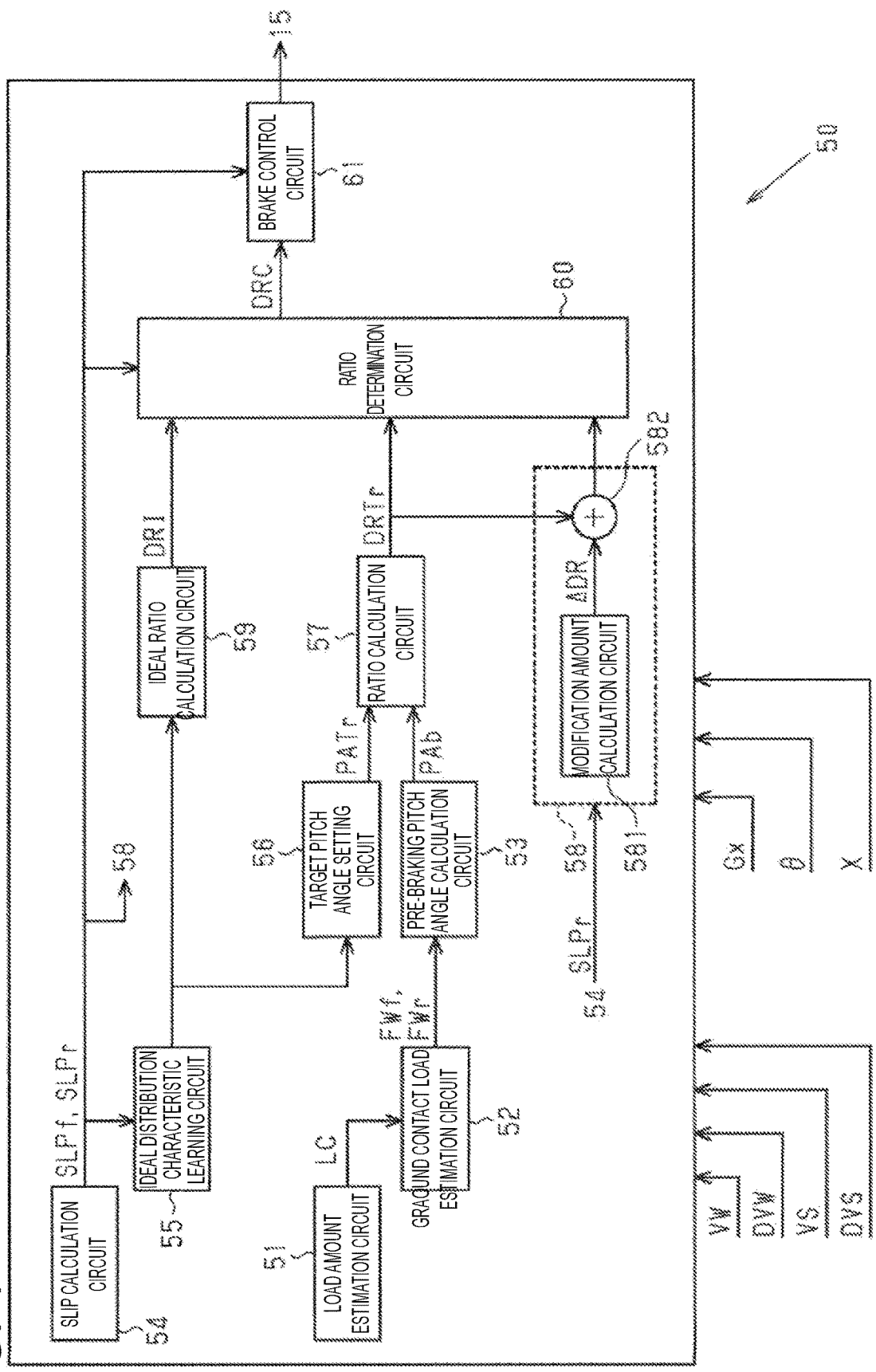
FIG. 4 is a block diagram showing a functional configuration of the brake control device.

FIG. 4 shows a functional configuration of the brake control device 50 for controlling the operation of the brake device 15 during braking. A load amount estimation circuit 51 of the brake control device 50 calculates an estimated value LC of the vehicle load amount. Under the condition that the driving force transmitted to the front wheels FL and FR, which are the driving wheels, is constant, the acceleration of the vehicle at the start of the vehicle is less likely to increase the larger the vehicle weight. Therefore, for example, the load amount estimation circuit 51 calculates the estimated value WS of the vehicle weight based on the driving force transmitted to the front wheels FL and FR and the acceleration of the vehicle at the start of the vehicle. Then, assuming the vehicle weight in a state where there is no load is an initial vehicle weight WSB, the load amount estimation circuit 51 calculates a value, which is obtained by subtracting the initial vehicle weight WSB from the calculated estimated value WS of the vehicle weight, as the estimated value LC of the vehicle load amount.

A ground contact load estimation circuit 52 of the brake control device 50 calculates, based on the gradient θ of the road surface on which the vehicle travels and the estimated value LC of the vehicle load amount estimated by the load amount estimation circuit 51, the estimated value of the ground contact load of the front wheels FL, FR as the ground contact load FWf of the front wheels and calculates the estimated value of the ground contact load of the rear wheels RL, RR as the ground contact load FWr of the rear wheels.

That is, when the road surface is an uphill road, the weight component supported by the rear wheels RL, RR tends to increase and the weight component supported by the front wheels FL, FR tends to decrease in the vehicle weight than when the road surface is not an uphill road. On the other hand, when the road surface is a downhill road, the weight component supported by the rear wheels RL, RR tends to decrease and the weight component supported by the front wheels FL, FR tends to increase in the vehicle weight than when the road surface is not a downhill road. Therefore, when the road surface is an uphill road, the ground contact load estimation circuit 52 calculates the ground contact loads FWf, FWr so that the ground contact load FWf of the front wheels decrease and the ground contact load FWr of the rear wheels increases, the larger the absolute value of the gradient θ of the road surface. Furthermore, when the road surface is a downhill road, the ground contact load estimation circuit 52 calculates the ground contact loads FWf, FWr so that the ground contact load FWf of the front wheels increases and the ground contact load FWr of the rear wheels decrease, the larger the absolute value of the gradient θ of the road surface.

In addition, the ground contact load of the wheel tends to easily increase the larger the vehicle load amount. In particular, it can be inferred that the larger the number of occupants in the front portion of the vehicle interior, the larger the load applied to the front wheels FL, FR. Therefore, the ground contact load estimation circuit 52 distributes the estimated value LC of the vehicle load amount to the load amount of the front portion of the vehicle and the load amount of the rear portion of the vehicle based on the number of occupants in the front portion of the vehicle interior. For example, the ground contact load estimation circuit 52 distributes the estimated value LC of the vehicle load amount to the load amount of the front portion of the vehicle and the load amount of the rear portion of the vehicle so that the load amount of the front portion of the vehicle increases as the number of occupants in the front portion of the vehicle interior increases. Then, the ground contact load estimation circuit 52 calculates the ground contact load FWf of the front wheels such that the ground contact load FWf of the front wheels increases as the load amount of the front portion of the vehicle increases. Furthermore, the ground contact load estimation circuit 52 calculates the ground contact load FWr of the rear wheels such that the ground contact load FWr of the rear wheels increases as the load amount of the rear portion of the vehicle increases.

A pre-braking pitch angle calculation circuit 53 of the brake control device 50 calculates a pre-braking pitch angle PAb that is the pitch angle PA of the vehicle at the time of non-braking of the vehicle. The pre-braking pitch angle calculation circuit 53 calculates the pre-braking pitch angle PAb based on the ground contact load FWf of the front wheels and the ground contact load FWr of the rear wheels calculated by the ground contact load estimation circuit 52. In other words, immediately before the start of vehicle braking, when it can be considered that the driving force is not transmitted to the front wheels FL, FR, which are the driving wheels, that is, when the vehicle is considered to be traveling by inertia, the length of the front wheel spring 21*f* becomes shorter as the ground contact load FWf of the front wheel increases and the length of the rear wheel spring 21*r* becomes shorter as the ground contact load FWr of the rear wheel increases. Therefore, the pre-braking pitch angle calculation circuit 53 calculates the length of each spring 21*f*, 21*r*, based on the specifications of the vehicle such as the spring constant of the front wheel spring 21*f* and the spring constant of the rear wheel spring 21*r*, so that the length of the front wheel spring 21*f* becomes a value corresponding to the ground contact load FWf of the front wheel and the length of the rear wheel spring 21*r* becomes a value corresponding to the ground contact load FWr of the rear wheel. Then, the pre-braking pitch angle calculation circuit 53 calculates the pre-braking pitch angle PAb based on the calculated lengths of the springs 21*f* and 21*r* and the wheel base length of the vehicle. The pre-braking pitch angle PAb to forward increases as the length of the front wheel spring 21*f* shortens. That is, the pre-braking pitch angle PAb to forward increases as the length of the rear wheel spring 21*r* lengthens. That is, the pre-braking pitch angle PAb is likely to be a value in the nose dive direction the larger the ground contact load FWf of the front wheels, that is, the smaller the ground contact load FWr of the rear wheels. Furthermore, the pre-braking pitch angle PAb is likely to be a value in the nose lift direction the smaller the ground contact load FWf of the front wheels, that is, the larger the ground contact load FWr of the rear wheels.

A slip calculation circuit 54 of the brake control device 50 calculates a slip value SLPf of the front wheels FL, FR and a slip value SLPr of the rear wheels RL, RR. The slip values SLPf and SLPr of the wheels are numerical values of the degree of deceleration slip of the wheels, and increase as the degree of deceleration slip of the wheels increases. For example, the slip calculation circuit 54 calculates a value obtained by subtracting the vehicle body deceleration DVS of the vehicle from the wheel deceleration DVW of the wheel as the slip values SLPf, SLPr of the wheels.

Figure 5:
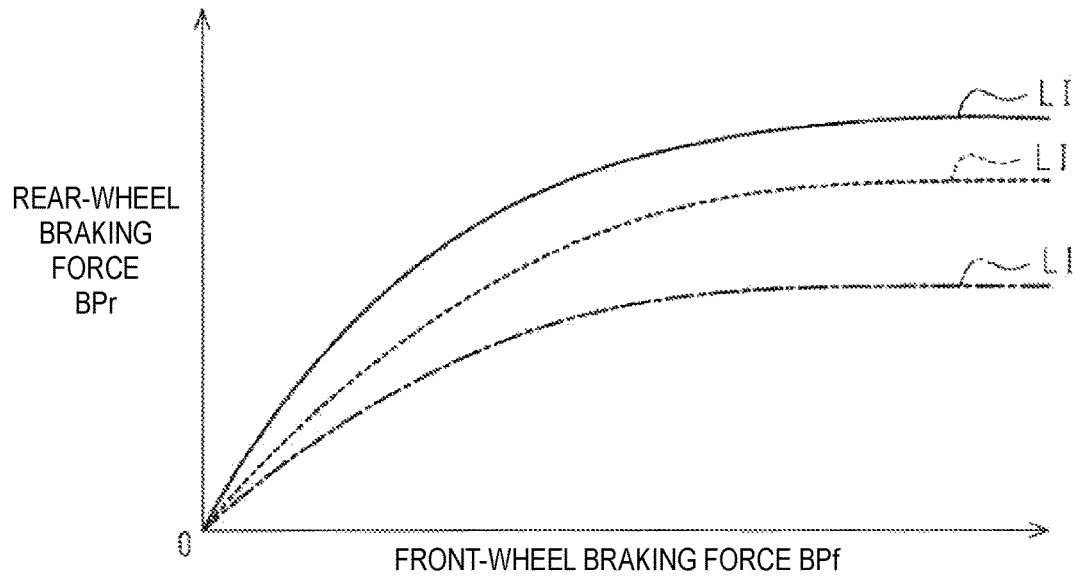
FIG. 5 is a graph showing a transition of an ideal front and rear braking force distribution ratio.

An ideal distribution characteristic learning circuit 55 of the brake control device 50 learns, based on the slip value SLPf of the front wheels FL, FR and the slip value SLPr of the rear wheels RL, RR during braking, an ideal distribution characteristic that represents the relationship between the ideal front and rear braking force distribution ratio DRI and the vehicle body deceleration DVS of the vehicle. The ideal front and rear braking force distribution ratio DRI is a front and rear braking force distribution ratio at which the front wheels FL, FR and the rear wheels RL, RR simultaneously lock during braking. FIG. 5 is a graph in which the horizontal axis represents the front-wheel braking force BPf and the vertical axis represents the rear-wheel braking force BPr, and FIG. 5 shows an ideal braking force distribution ratio line LI which is a line representing the ideal distribution characteristic. As shown in FIG. 5, the ideal front and rear braking force distribution ratio DRI changes so that the rear-wheel braking force BPr decreases as the front-wheel braking force BPf increases. A specific learning method of the ideal distribution characteristic of the vehicle will be described later.

Returning to FIG. 4, a target pitch angle setting circuit 56 of the brake control device 50 sets the target pitch angle PATr during braking immediately before the start of vehicle braking. That is, in the case of vehicle braking accompanying the driver's braking operation, the target pitch angle setting circuit 56 sets the target pitch angle PATr when detecting the start of operation of the brake operation member 16. Furthermore, in the case of automatic braking during automatic traveling of the vehicle, the target pitch angle setting circuit 56 sets the target pitch angle PATr when the brake control device 50 is requested to start automatic braking.

The target pitch angle setting circuit 56 sets a target pitch angle reference value PATrB that serves as a reference of the target pitch angle PATr depending on whether it is vehicle braking accompanying the driver's braking operation (manual braking) or is automatic braking during automatic traveling. The pitch angle PA when the vehicle is stationary in the non-loaded state is set as the reference pitch angle PAs. The target pitch angle setting circuit 56 sets the target pitch angle reference value PATrB to forward during manual braking is more than the reference pitch angle PAs to forward. On the other hand, the target pitch angle setting circuit 56 sets the target pitch angle reference value PATrB to forward during automatic braking is less than the target pitch angle reference value PATrB to forward during manual braking.

Furthermore, the target pitch angle setting circuit 56 modifies the target pitch angle reference value PATrB based on the ideal distribution characteristic of the vehicle (i.e., ideal distribution characteristic grasped by the brake control device 50) learnt by the ideal distribution characteristic learning circuit 55 and the gradient θ of the road surface on which the vehicle travels, and derives the modified value as the target pitch angle PATr. A method of modifying the target pitch angle reference value PATrB and deriving the target pitch angle PATr will be described later.

When the target pitch angle PATr is set by the target pitch angle setting circuit 56, a ratio calculation circuit 57 of the brake control device 50 calculates the target front and rear braking force distribution ratio DRTr. That is, the ratio calculation circuit 57 calculates the target front and rear braking force distribution ratio DRTr immediately before the start of vehicle braking. The ratio calculation circuit 57 calculates the target front and rear braking force distribution ratio DRTr based on the pre-braking pitch angle PAb calculated by the pre-braking pitch angle calculation circuit 53 and the target pitch angle PATr set by the target pitch angle setting circuit 56.

The ratio calculation circuit 57 may calculate the target front and rear braking force distribution ratio DRTr so that the distribution of the braking forces to the front wheels FL, FR increases as the difference between the pre-braking pitch angle PAb and the target pitch angle PATr increases. This occurs when the target pitch angle PATr to forward is more than the pre-braking pitch angle PAb.

During braking, an amount of change in the pitch angle PA of the vehicle to forward is an amount corresponding to the sum of the anti-dive force FAD which is a force corresponding to the front-wheel braking force BPf and the anti-lift force FAL which is a force corresponding to the rear-wheel braking force BPr. Therefore, the ratio calculation circuit 57 calculates the front and rear braking force distribution ratio DR as the target front and rear braking force distribution ratio DRTr such that the sum of the anti-dive force FAD and the anti-lift force FAL becomes a value corresponding to the difference between the target pitch angle PATr and the pre-braking pitch angle PAb. That is, if the target pitch angle PATr to forward is more than the pre-braking pitch angle PAb to forward, the ratio calculation circuit 57 calculates the target front and rear braking force distribution ratio DRTr so that the pitch angle of the vehicle inferred from the anti-dive force FAD and the anti-lift force FAL generated in the vehicle during braking becomes the target pitch angle PATr.

Even if the target pitch angle PATr to backward is more than the pre-braking pitch angle PAb to backward, the difference between the pre-braking pitch angle PAb and the target pitch angle PATr may not be so large. When the difference is small as described above, the ratio calculation circuit 57 calculates the target front and rear braking force distribution ratio DRTr so that the distribution of the braking force to the rear wheels RL and RR increases than when the difference is large. The sum of the anti-dive force FAD and the anti-lift force FAL can be made different from the case where the difference is large by performing the vehicle braking based on the target front and rear braking force distribution ratio DRTr. As a result, the change of the pitch angle PA of the vehicle to backward may be prevented.

A ratio modification circuit 58 of the brake control device 50 includes a modification amount calculation circuit 581 that calculates a modification amount ΔDR of the front and rear braking force distribution ratio DR based on the slip value SLPr of the rear wheels RL and RR calculated by the slip calculation circuit 54, and an addition circuit 582. The modification amount calculation circuit 581 sets the modification amount ΔDR to "0" when the slip value SLPTh of the rear wheels RL and RR is less than the determination slip value SLPTh. On the other hand, the modification amount calculation circuit 581 makes the modification amount ΔDR equal to a specified value smaller than "0" when the slip value SLPr of the rear wheels RL, RR is larger than or equal to the determination slip value SLPth.

When the learning of the ideal distribution characteristic by the ideal distribution characteristic learning circuit 55 is not in time, the ideal distribution characteristic grasped by the brake control device 50 may deviate from the actual ideal distribution characteristic. In such a case, the lock tendency of the rear wheels RL, RR may be large even though the lock tendency of the front wheels FL, FR is not so large. When the lock tendency of the rear wheels RL, RR is large under a situation where the front-wheel braking force BPf and the rear-wheel braking force BPr are adjusted with the target front and rear braking force distribution ratio DRTr calculated by the ratio calculation circuit 57, the target front and rear braking force distribution ratio DRTr needs to be modified so that the rear-wheel braking force BPr is less likely to increase to suppress reduction of the stability of the vehicle behavior. Therefore, the determination slip value SLPTh is set so that whether or not the target front and rear braking force distribution ratio DRTr needs to be modified can be determined based on the slip values SLPr of the rear wheels RL and RR.

The addition circuit 582 calculates the sum of the target front and rear braking force distribution ratio DRTr calculated by the ratio calculation circuit 57 and the modification amount ΔDR calculated by the modification amount calculation circuit 581 as the target front and rear braking force distribution ratio DRTr after modification. Therefore, when the modification amount ΔDR is equal to the specified value, the target front and rear braking force distribution ratio DRTr after modification decrease than the target front and rear braking force distribution ratio DRTr before modification.

An ideal ratio calculation circuit 59 of the brake control device 50, based on the ideal distribution characteristic learned by the ideal distribution characteristic learning circuit 55, that is, the ideal distribution characteristic grasped by the brake control device 50, calculates the ideal front and rear braking force distribution ratio DRI at this time. That is, the ideal ratio calculation circuit 59, based on the ideal braking force distribution ratio line LI shown in FIG. 5, calculates a ratio based on the vehicle body deceleration DVS of the vehicle at this time as the ideal front and rear braking force distribution ratio DRI.

A ratio determination circuit 60 of the brake control device 50 determines a control front and rear braking force distribution ratio DRC based on the target front and rear braking force distribution ratio DRTr calculated by the ratio calculation circuit 57, the target front and rear braking force distribution ratio DRTr after modification calculated by the ratio modification circuit 58, and the ideal front and rear braking force distribution ratio DRI calculated by the ideal ratio calculation circuit 59. The method for determining the control front and rear braking force distribution ratio DRC will be described later.

The brake control circuit 61 of the brake control device 50 controls the operation of the brake device 15 based on the control front and rear braking force distribution ratio DRC determined by the ratio determination circuit 60 during braking. That is, the brake control circuit 61 controls the brake device 15 so that the ratio of the rear-wheel braking force BPr with respect to the front-wheel braking force BPf becomes the control front and rear braking force distribution ratio DRC. A specific method of controlling the brake device 15 by the brake control circuit 61 will be described later.

In the present embodiment, the control front and rear braking force distribution ratio DRC is the target front and rear braking force distribution ratio DRTr, and the control of the brake device 15 by the brake control circuit 61 based on the control front and rear braking force distribution ratio DRC is referred to as the "stability control". The control front and rear braking force distribution ratio DRC is the ideal front and rear braking force distribution ratio DRI, and the control of the brake device 15 by the brake control circuit 61 based on the control front and rear braking force distribution ratio DRC is referred to as the "stable control".

Next, the learning process of the ideal distribution characteristic of the vehicle by the ideal distribution characteristic learning circuit 55 will be described with reference to FIG. 5.

The ideal distribution characteristic learning circuit 55 learns the ideal distribution characteristic so that the deviation between the slip value SLPr of the rear wheels RL, RR and the slip value SLPf of the front wheels FL, FR becomes small during braking. Specifically, when the slip value SLPr of the rear wheels RL, RR is larger than the slip value SLPf of the front wheels FL, FR, the ideal distribution characteristic learning circuit 55 determines that the lock tendency of the rear wheels FL, FR is larger than the lock tendency of the front wheels FL, FR and that there is a possibility that the rear wheels RL and RR may lock before the front wheels FL and FR. Therefore, the ideal distribution characteristic learning circuit 55 changes the ideal distribution characteristic so that the front-wheel braking force BPf increases. In FIG. 5, assume that the ideal braking force distribution ratio line LI representing the ideal distribution characteristic that the ideal distribution characteristic learning circuit 55 has grasped so far is represented by a broken line. In this case, when the ideal distribution characteristic learning circuit 55 determines that there is a possibility that the rear wheels RL, RR may lock before the front wheels FL, FR, for example, the characteristic that can be represented by the ideal braking force distribution ratio line LI indicated by a one-dot chain line in FIG. 5 is stored as the ideal distribution characteristic.

On the other hand, during braking, when the slip value SLPf of the front wheels FL, FR is larger than the slip value SLPr of the rear wheels RL, RR, the ideal distribution characteristic learning circuit 55 determines that there is a possibility that the lock tendency of the front wheels FL, FR is larger than the lock tendency of the rear wheels RL, RR and that the front wheels FL and FR may lock before the rear wheels RL and RR. Therefore, the ideal distribution characteristic learning circuit 55 changes the ideal distribution characteristic so that the rear-wheel braking force BPr increases. In FIG. 5, assume that the ideal braking force distribution ratio line LI representing the ideal distribution characteristic that the ideal distribution characteristic learning circuit 55 has grasped so far is represented by a broken line. In this case, when the ideal distribution characteristic learning circuit 55 determines that there is a possibility that the front wheels FL, FR may lock before the rear wheels RL, RR, for example, the characteristic that can be represented by the ideal braking force distribution ratio line LI indicated by a solid line in FIG. 5 is stored as the ideal distribution characteristic.

Next, a process executed when the target pitch angle setting circuit 56 derives the target pitch angle PATr will be described.

The target pitch angle setting circuit 56 calculates the pitch angle modification amount $\Delta PA$ corresponding to the ideal distribution characteristic of the vehicle learnt by the ideal distribution characteristic learning circuit 55 and the gradient $\theta$ of the road surface on which the vehicle travels. Then, the target pitch angle setting circuit 56 calculates the sum of the target pitch angle reference value PATrB and the pitch angle modification amount $\Delta PA$ as the target pitch angle PATr.

That is, the target pitch angle setting circuit 56 derives the ideal front and rear braking force distribution ratio DRI at the initial stage of braking based on the ideal distribution characteristic, and calculates the pitch angle modification amount $\Delta PA$ so that the pitch angle modification amount $\Delta PA$ increases the larger the derived ideal front and rear braking force distribution ratio DRI. Furthermore, the target pitch angle setting circuit 56 modifies the pitch angle modification amount $\Delta PA$ calculated based on the ideal front and rear braking force distribution ratio DRI at the initial stage of braking according to the gradient $\theta$ of the road surface on which the vehicle travels. It is more difficult to change the pitch angle PA to forward of the vehicle when the road surface is an uphill road when the road surface is an uphill road than when the road surface is not an uphill road. On the other hand, when the road surface is a downhill road, it is easier to change the pitch angle PA to forward of the vehicle than when the road surface is not a downhill road. Therefore, the target pitch angle setting circuit 56 performs a modification to increase the pitch angle modification amount $\Delta PA$ when the road surface is an uphill road, and performs a modification to decrease the pitch angle modification amount $\Delta PA$ when the road surface is a downhill road.

Next, with reference to FIGS. 6 and 7, a processing routine executed when the ratio determination circuit 60 determines the control front and rear braking force distribution ratio DRC will be described. This processing routine is executed every predetermined control cycle during braking.

Figure 7:
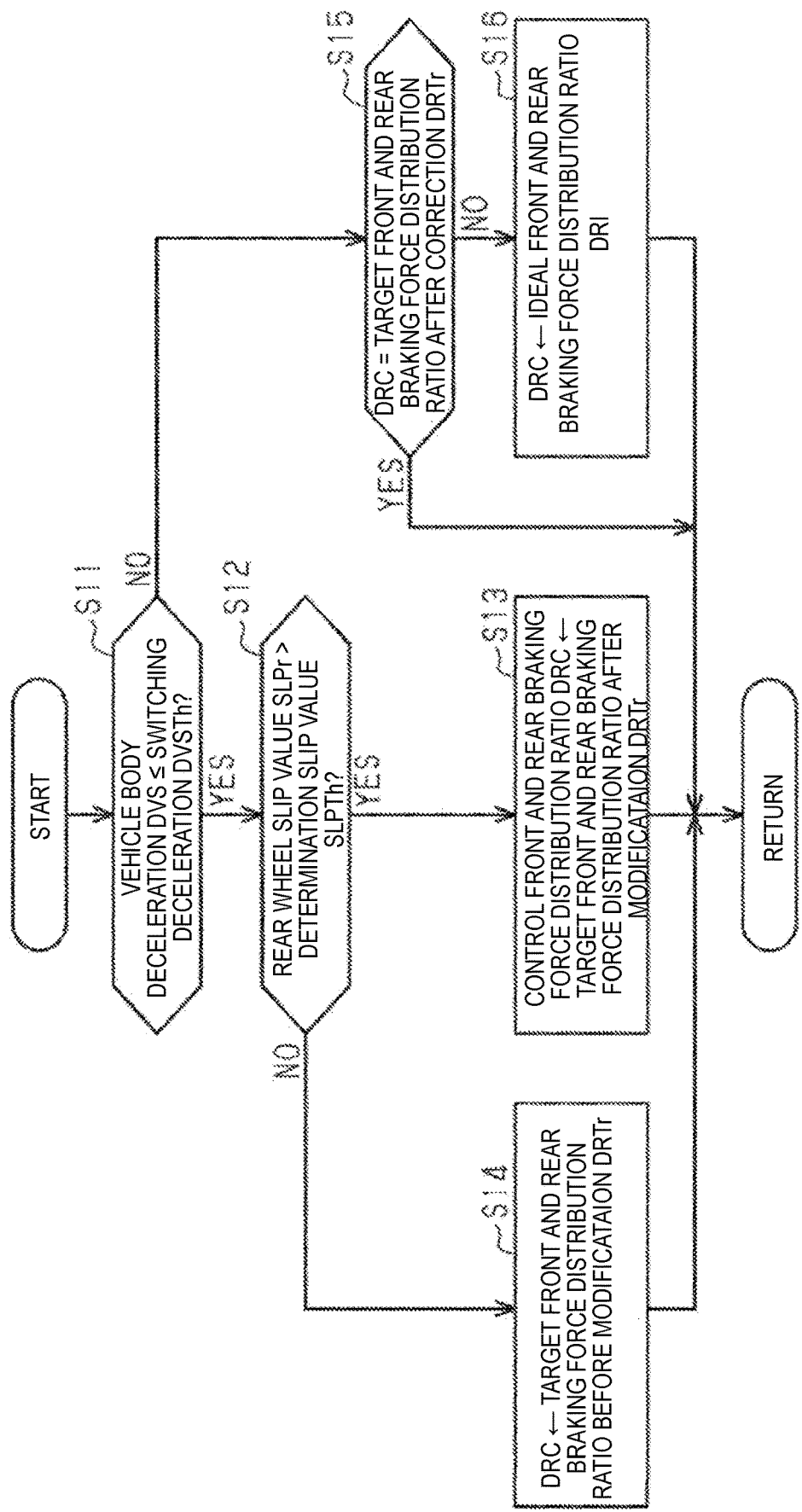
FIG. 7 is a flowchart describing a processing routine executed to set a control front and rear braking force distribution ratio.

As shown in FIG. 7, in this processing routine, the ratio determination circuit 60 determines whether the vehicle body deceleration DVS of the vehicle is less than or equal to a switching deceleration DVSTh (S11). The switching deceleration DVSTh is a determination value for determining the timing at which control is switched from the stability control to the stable control.

Here, the switching deceleration DVSTh will be described with reference to FIG. 6. In FIG. 6, the broken line is the ideal braking force distribution ratio line LI, and the solid line is the target braking force distribution ratio line LTr which is a line representing the relationship between the target front and rear braking force distribution ratio DRTr and the vehicle body deceleration DVS. In FIG. 6, a plurality of constant deceleration lines A1, A2, A3 are shown by a one-dot chain line. The first constant deceleration line A1 is a line connecting points indicating the front-wheel braking force BPf and the rear-wheel braking force BPr when the vehicle body deceleration DVS becomes the first deceleration DVS1. The second constant deceleration line A2 is a line connecting points indicating the front-wheel braking force BPf and the rear-wheel braking force BPr when the vehicle body deceleration DVS becomes the second deceleration DVS2. Furthermore, the third constant deceleration line A3 is a line connecting points indicating the front-wheel braking force BPf and the rear-wheel braking force BPr when the vehicle body deceleration DVS becomes the third deceleration DVS3. The first deceleration DVS1 is larger than the second and third decelerations DVS2 and DVS3, and the third deceleration DVS3 is smaller than the first and second decelerations DVS1 and DVS2.

Figure 6:
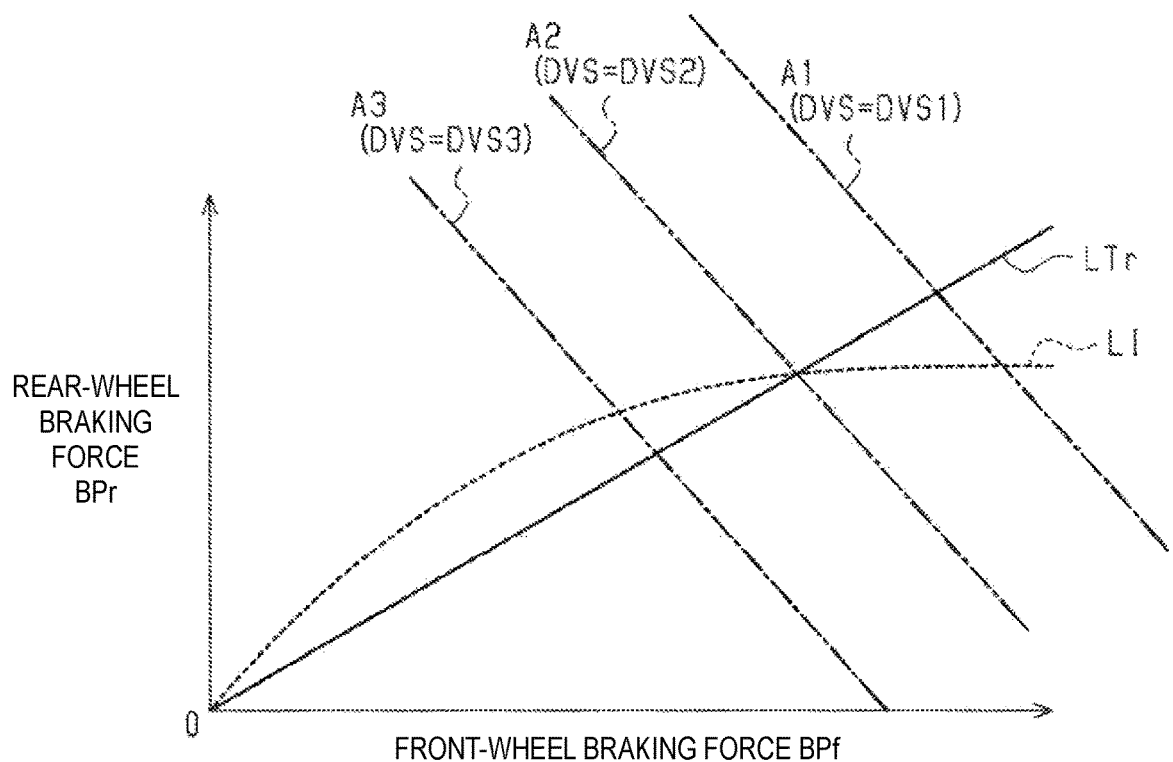
FIG. 6 is a graph showing a relationship between the ideal front and rear braking force distribution ratio and a target front and rear braking force distribution ratio.

In the graph shown in FIG. 6, the second constant deceleration line A2 passes through a point where the ideal braking force distribution ratio line LI and the target braking force distribution ratio line LTr intersect with each other. That is, in a case where the stability control using the target front and rear braking force distribution ratio DRTr is performed, when the vehicle body deceleration DVS of the vehicle exceeds the second deceleration DVS2, the lock tendency of the rear wheels RL, RR increases than the lock tendency of the front wheels FL, FR, and the stability of the vehicle behavior may reduce. Therefore, the switching deceleration DVSTh is set to a value corresponding to the vehicle body deceleration (the second deceleration DVS in the example shown in FIG. 6) when the ideal braking force distribution ratio line LI and the target braking force distribution ratio line LTr intersect. In the present embodiment, the switching deceleration DVSTh is set to a value equal to the vehicle body deceleration when the ideal braking force distribution ratio line LI and the target braking force distribution ratio line LTr intersect.

The switching deceleration DVSTh is set based on the ideal braking force distribution ratio line LI representing the ideal distribution characteristic grasped by the brake control device 50 and the target braking force distribution ratio line LTr. When the ideal distribution characteristic learning circuit 55 learns the ideal distribution characteristic, the vehicle body deceleration when the ideal braking force distribution ratio line Ll representing the ideal distribution characteristic grasped by the brake control device 50 and the target braking force distribution ratio line LTr intersect changes. Therefore, when the ideal distribution characteristic grasped by the brake control device 50 changes, the switching deceleration DVSTh changes. Even if the ideal distribution characteristic grasped by the brake control device 50 does not change, the switching deceleration DVSTh changes when the target front and rear braking force distribution ratio DRTr calculated by the ratio calculation circuit 57 changes. The setting of the switching deceleration DVSTh is also performed by the ratio determination circuit 60.

Returning to FIG. 7, when the vehicle body deceleration DVS is less than or equal to the switching deceleration DVSTh (S11: YES), the ratio determination circuit 60 determines whether the slip value SLPr of the rear wheels RL and RR calculated by the slip calculation circuit 54 is larger than the determination slip value SLPTh (S12). For example, in step S12, determination may be made that the slip value SLPr is larger than the determination slip value SLPTh when the average value of the slip value SLPr of the left rear wheel RL and the slip value SLPr of the right rear wheel RR is larger than the determination slip value SLPTh. Furthermore, in step S12, determination may be made that the slip value SLPr is larger than the determination slip value SLPTh when at least one of the slip value SLPr of the left rear wheel RL and the slip value SLPr of the right rear wheel RR is larger than the determination slip value SLPTh. When the slip value SLPr is larger than the determination slip value SLPTh, the ideal distribution characteristic learning circuit 55 has not learnt the ideal distribution characteristic in time, and determination is made that increase of the rear-wheel braking force BPr needs to be limited by making the front and rear braking force distribution ratio DR smaller. Therefore, when the slip value SLPr is larger than the determination slip value SLPTh (S12: YES), the ratio determination circuit 60 selects the target front and rear braking force distribution ratio DRTr after modification calculated by the ratio modification circuit 58 as the control front and rear braking force distribution ratio DRC (S13). This makes it possible to make the control front and rear braking force distribution ratio DRC smaller as compared with a case where the target front and rear braking force distribution ratio DRTr before modification calculated by the ratio calculation circuit 57 is selected as the control front and rear braking force distribution ratio DRC. Thereafter, the ratio determination circuit 60 temporarily ends the present processing routine.

On the other hand, when the slip value SLPr is less than or equal to the determination slip value SLPTh (S12: NO), the ratio determination circuit 60 selects the target front and rear braking force distribution ratio DRTr before modification calculated by the ratio calculation circuit 57 as the control front and rear braking force distribution ratio DRC (S14). Thereafter, the ratio determination circuit 60 temporarily ends the present processing routine.

On the other hand, when the vehicle body deceleration DVS is larger than the switching deceleration DVSTh in step S11 (NO), the ratio determination circuit 60 determines whether the target front and rear braking force distribution ratio DRTr after modification is selected as the control front and rear braking force distribution ratio DRC (S15). When the target front and rear braking force distribution ratio DRTr after modification is selected, determination is made that the control for limiting the increase of the rear-wheel braking force BPr has already been executed to suppress the reduction of the stability of the vehicle behavior.

Therefore, when the target front and rear braking force distribution ratio DRTr after modification is selected (S15: YES), the ratio determination circuit 60 once ends the present processing routine. On the other hand, when the target front and rear braking force distribution ratio DRTr after modification is not selected (S15: NO), the ratio determination circuit 60 selects the ideal front and rear braking force distribution ratio DRI as the control front and rear braking force distribution ratio DRC (S16). Thereafter, the ratio determination circuit 60 temporarily ends the present processing routine.

Figure 8:
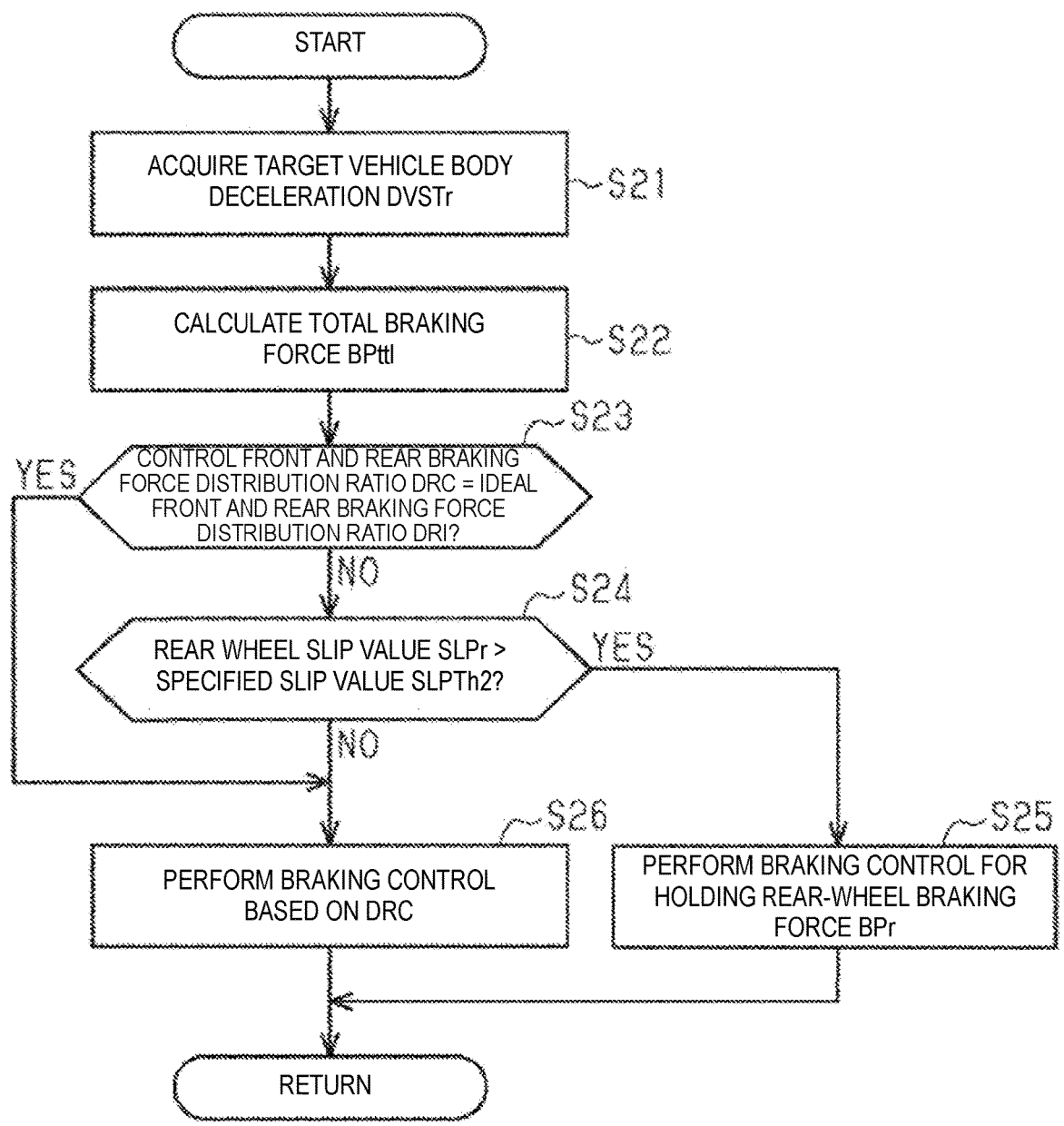
FIG. 8 is a flowchart describing a processing routine executed to control the operation of the brake device.

Next, with reference to FIG. 8, a processing routine executed by the brake control circuit 61 to control the operation of the brake device 15 will be described. This processing routine is executed every predetermined control cycle during vehicle braking.

In this processing routine, the brake control circuit 61 acquires the target vehicle body deceleration DVSTr, which is the target value of the vehicle body deceleration DVS (S21). In the vehicle braking accompanying the driver's braking operation (manual braking), the target vehicle body deceleration DVSTr increases as the braking operation amount X, which is the operation amount of the brake operation member 16, increases. On the other hand, in the automatic braking during the automatic traveling of the vehicle, the target vehicle body deceleration DVSTr is determined by an application for automatic traveling. Subsequently, the brake control circuit 61 calculates the total braking force BPttl, which is the target value for the total of the braking forces for the wheels FL, FR, RL, and RR, based on the target vehicle body deceleration DVSTr (S22). Specifically, the brake control circuit 61 calculates the total braking force BPttl so that the total braking force BPttl increases as the target vehicle body deceleration DVSTr increases.

Then, the brake control circuit 61 determines whether the ideal front and rear braking force distribution ratio DRI calculated by the ideal ratio calculation circuit 59 is selected as the control front and rear braking force distribution ratio DRC (S23). When the ideal front and rear braking force distribution ratio DRI is selected, determination is made that the control has already shifted from the stability control to the stable control. On the other hand, when the ideal front and rear braking force distribution ratio DRI is not selected, determination is not made that the control has shifted to the stable control.

Therefore, when the ideal front and rear braking force distribution ratio DRI is selected (S23: YES), the brake control circuit 61 proceeds the process to step S26 described later. On the other hand, when the ideal front and rear braking force distribution ratio DRI is not selected (S23: NO), the brake control circuit 61 determines whether the slip value SLPr of the rear wheels RL, RR calculated by the slip calculation circuit 54 is larger than a specified slip value SLPTh2 (S24). The specified slip value SLPTh2 is set to a value larger than the determination slip value SLPTh. When the slip value SLPr has increased to around the specified slip value SLPTh2 under a situation where the stability control is being performed, it can be assumed that the target front and rear braking force distribution ratio DRTr after modification is selected as the control front and rear braking force distribution ratio DRC. Then, even if the front-wheel braking force BPf and the rear-wheel braking force BPr are adjusted based on the target front and rear braking force distribution ratio DRTr after modification, the brake control circuit 61 determines that the suppression in the reduction of the stability of the vehicle behavior is not sufficient. Therefore, when the slip value SLPr of the rear wheels RL, RR is larger than the specified slip value SLPTh2 (S24: YES), the brake control circuit 61 performs a rear-wheel braking holding control for holding the rear-wheel braking force BPr rather than a control using the control front and rear braking force distribution ratio DRC (S25). In the rear-wheel braking holding control, the brake control circuit 61 controls the brake device 15 so that the front-wheel braking force BPf increases without increasing the rear-wheel braking force BPr even if the total braking force BPttl calculated in step S22 is increased. Thereafter, the brake control circuit 61 temporarily ends the present processing routine.

On the other hand, when the slip value SLPr is less than or equal to the specified slip value SLPTh2 (S24: NO), the brake control circuit 61 proceeds the process to the next step S26.

In step S26, the brake control circuit 61 executes the braking control based on the control front and rear braking force distribution ratio DRC. That is, when the target front and rear braking force distribution ratio DRTr is selected as the control front and rear braking force distribution ratio DRC, the brake control circuit 61 executes the stability control. Furthermore, when the ideal front and rear braking force distribution ratio DRI is selected as the control front and rear braking force distribution ratio DRC, the brake control circuit 61 executes the stable control. Thereafter, the brake control circuit 61 temporarily ends the present processing routine.

Next, the operation and effect of the present embodiment will be described with reference to FIGS. 9 to 12.

First, referring to FIGS. 9 and 10, the operation and effect when the ideal distribution characteristic learnt by the ideal distribution characteristic learning circuit 55, that is, the ideal distribution characteristic grasped by the brake control device 50 is not deviated from the actual ideal distribution characteristic will be described.

When vehicle braking is started by the start of driver's braking operation or the like while the vehicle is traveling, the brake control device 50 starts the stability control. Then, when the brake device 15 is operated by the stability control, the front-wheel braking force BPf and the rear-wheel braking force BPr are adjusted so that the actual front and rear braking force distribution ratio DR matches the target front and rear braking force distribution ratio DRTr before modification.

Then, in the vehicle, the anti-dive force FAD corresponding to the front-wheel braking force BPf is generated, and the anti-lift force FAL corresponding to the rear-wheel braking force BPr is generated. Furthermore, a pitching moment PM corresponding to the sum of the front-wheel braking force BPf and the rear-wheel braking force BPr is generated in the vehicle. In this case, the force against the pitching moment PM caused by the sum of the anti-dive force FAD and the anti-lift force FAL and the pitching moment PM act on the vehicle, and as a result, the pitch angle PA of the vehicle approaches the target pitch angle PATr.

In the present embodiment, the front-wheel braking force BPf and the rear-wheel braking force BPr are adjusted based on the target front and rear braking force distribution ratio DRTr in this way from the start of vehicle braking. Therefore, compared with a case where the adjustment of the front-wheel braking force BPf and the rear-wheel braking force BPr based on the target front and rear braking force distribution ratio DRTr is started after the pitch angle PA of the vehicle is deviated from the target pitch angle PATr, the fluctuations in the pitch angle PA of the vehicle during braking may be prevented.

Figure 9:
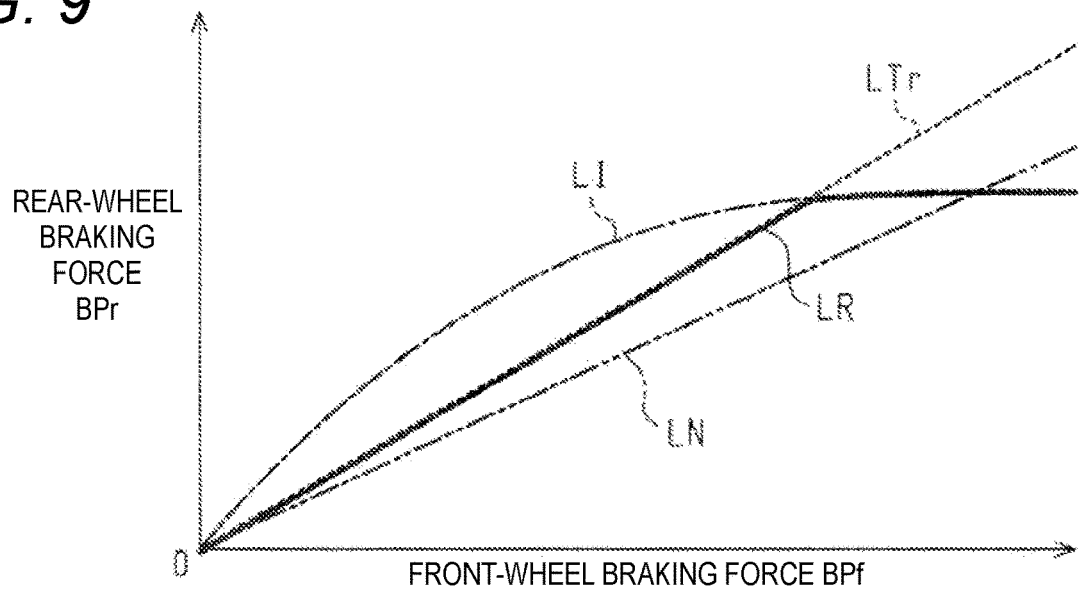
FIG. 9 is an operation diagram when control is switched from a stability control to a stable control.

In FIG. 9, the solid line is a characteristic line LR representing the characteristic of the relationship between the actual front and rear braking force distribution ratio DR and the vehicle body deceleration DVS. Furthermore, in FIG. 9, the broken line is the target braking force distribution ratio line LTr, and the one-dot chain line is the ideal braking force distribution ratio line LI. Moreover, in FIG. 9, a two-dot chain line is a characteristic line LN representing the characteristic of the relationship between the distribution ratio of the front and rear braking forces and the vehicle body deceleration DVS when no control for distributing the front and rear braking forces is performed. In the example shown in FIG. 9, the rear-wheel braking force BPr increases compared with a case where no control for distributing the front and rear braking forces is performed by adjusting the front-wheel braking force BPf and the rear-wheel braking force BPr based on the target front and rear braking force distribution ratio DRTr. Therefore, the pitch angle PA of the vehicle can be set to a value closer to the nose lift direction, as compared with a case where no control for distributing the front and rear braking forces is performed.

The ratio calculation circuit 57 calculates the target front and rear braking force distribution ratio DRTr so that the pitch angle of the vehicle estimated using the anti-dive force FAD and the anti-lift force FAL generated in the vehicle during braking becomes the target pitch angle PATr. Therefore, the controllability of the pitch angle PA of the vehicle during braking can be enhanced by adjusting the front-wheel braking force BPf and the rear-wheel braking force BPr based on the target front and rear braking force distribution ratio DRTr.

Figure 10A:
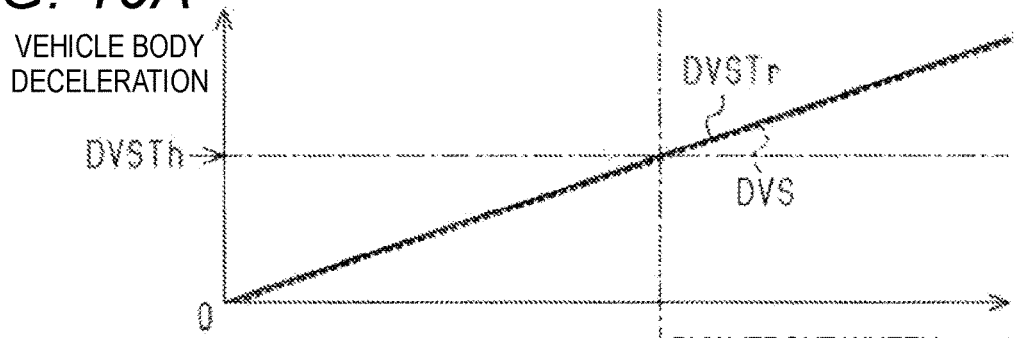
FIGS. 10($a$) to 10($c$) are timing charts when control is switched from the stability control to the stable control.
Figure 10B:
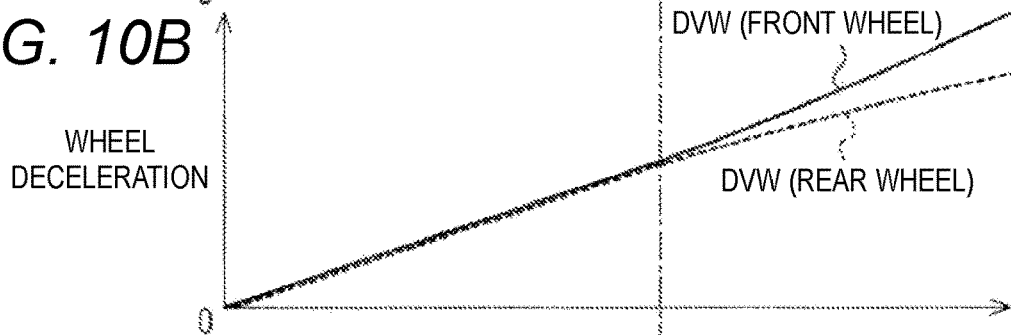
Figure 10C:
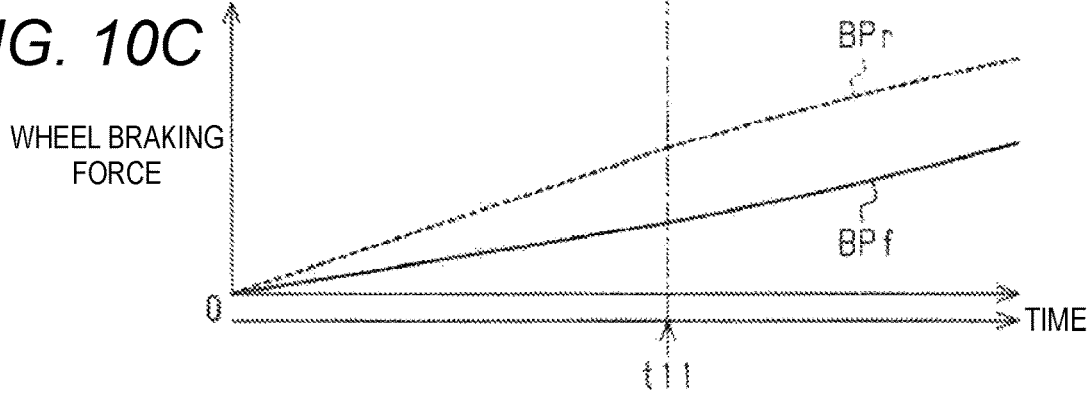

As shown in FIGS. 10(a), 10(b), and 10(c), when the target vehicle body deceleration DVSTr increases, the total braking force BPttl is calculated so that the vehicle body deceleration DVS of the vehicle increases following the target vehicle body deceleration DVSTr, and this total braking force BPttl is distributed to each wheel FL, FR, RL, RR. At this time, in the present embodiment, when the vehicle body deceleration DVS of the vehicle is less than the switching deceleration DVSTh, the actual front and rear braking force distribution ratio DR is held at the target front and rear braking force distribution ratio DRTr even if the target vehicle body deceleration DVSTr is increased. As a result, even if the vehicle body deceleration DVS of the vehicle increases, the pitch angle PA of the vehicle can be prevented from deviating from the target pitch angle PATr.

Then, the vehicle body deceleration DVS increases following the increase of the target vehicle body deceleration DVSTr, and the vehicle body deceleration DVS reaches the switching deceleration DVSTh at timing t11. In the example shown in FIG. 10, the target vehicle body deceleration DVSTr continues to increase even after timing t11. Then, in the present embodiment, the control is switched from the stability control to the stable control, and therefore, as shown in FIG. 9, the front-wheel braking force BPf and the rear-wheel braking force BPr are adjusted so that the actual front and rear braking force distribution ratio DR becomes the ideal front and rear braking force distribution ratio DRI. Under a situation where the vehicle body deceleration DVS is larger than the switching deceleration DVSTh, the ideal front and rear braking force distribution ratio DRI is smaller than the target front and rear braking force distribution ratio DRTr. Therefore, as shown in FIGS. 10(a), 10(b), and 10(c), after timing t11, the increasing speed of the rear-wheel braking force BPr when the target vehicle body deceleration DVSTr increases becomes small. That is, the increase of the rear-wheel braking force BPr is limited. Thus, even after timing t11, the lock tendency of the rear wheels RL, RR can be suppressed from becoming larger than the lock tendency of the front wheels FL, FR, and consequently, the reduction of the stability of the vehicle behavior can be suppressed as compared with a case where the front-wheel braking force BPf and the rear-wheel braking force BPr are adjusted based on the target front and rear braking force distribution ratio DRTr.

It should be noted that the increasing speed of the front-wheel braking force BPf increases as the increase of the rear-wheel braking force BPr is limited in this way. Therefore, even if the control is switched from the stability control to the stable control, the vehicle body deceleration DVS of the vehicle can be suppressed from deviating from the target vehicle body deceleration DVSTr.

In the present embodiment, the ideal front and rear braking force distribution ratio DRI is updated according to the vehicle body deceleration DVS. That is, the ideal front and rear braking force distribution ratio DRI is updated so that the rear-wheel braking force BPr is less likely to increase as the vehicle body deceleration DVS increases. In the present embodiment, when the stable control is performed, the front-wheel braking force BPf and the rear-wheel braking force BPr are adjusted so that the actual front and rear braking force distribution ratio DR follows the ideal front and rear braking force distribution ratio DRI that is sequentially updated as shown in FIG. 9. Therefore, under a situation where the vehicle body deceleration DVS is larger than or equal to the switching deceleration DVSTh, the deviation between the pitch angle PA of the vehicle and the target pitch angle PATr after the stability control is terminated, as compared with a case where the front-wheel braking force BPf is increased but the rear-wheel braking force BPr is not increased when the target vehicle body deceleration DVSTr is increased.

Here, a method of switching the control from the stability control to the stable control based on the lock tendency of the wheels is also conceivable. When calculating the value representing the lock tendency of the wheels, the vehicle body speed VS calculated based on the wheel speed VW, the vehicle body deceleration DVS calculated based on this vehicle body speed VS, and the like are used. During braking, the vehicle body speed VS tends to be lower than the actual vehicle body speed. Therefore, the calculated value of the value representing the lock tendency of the wheels tends to be smaller than the actual value representing the lock tendency of the wheels. As a result, it is determined that the lock tendency of the rear wheels RL, RR is not so large even though the lock tendency of the rear wheels RL, RR is becoming large, and the switching from the stability control to the stable control may be delayed.

In this regard, in the present embodiment, the control switching timing is determined using the vehicle body deceleration DVS of when the stability control is being performed. As a result, when the ideal distribution characteristic grasped by the brake control device 50 is not deviated from the actual ideal distribution characteristic, an event in which the control switching timing is delayed and the stability of the vehicle behavior reduces is less likely to occur, as compared with a case where the control switching timing is determined based on the lock tendency of the rear wheels RL, RR.

Figure 11:
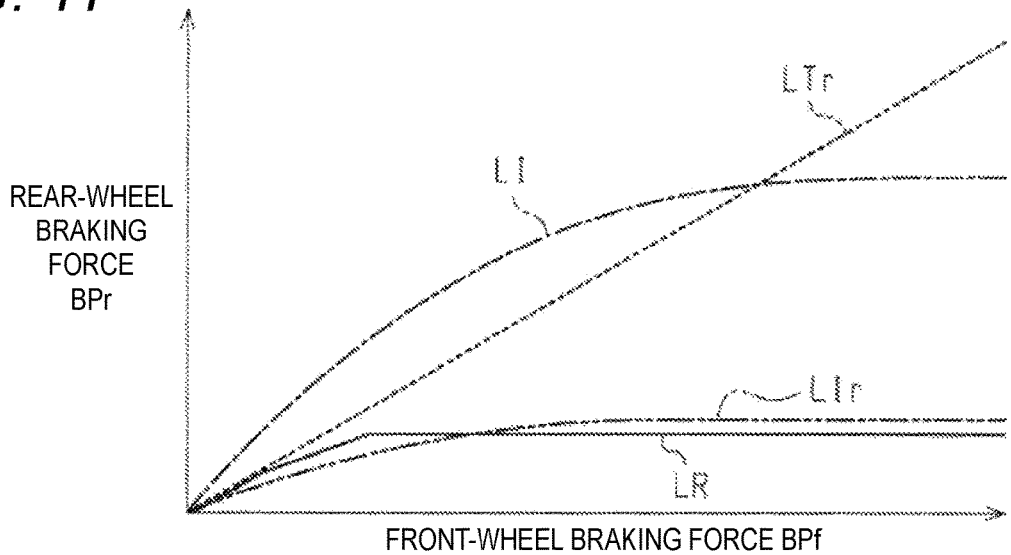
FIG. 11 is an operation diagram when the target front and rear braking force distribution ratio used in the stability control is changed.

Next, with reference to FIG. 11 and FIG. 12, the operation and effect when the ideal distribution characteristic grasped by the brake control device 50 is deviated from the actual ideal distribution characteristic will be described. Note that, in FIG. 11, the ideal braking force distribution ratio line LI representing the ideal distribution characteristic grasped by the brake control device 50 is represented by a one-dot chain line, and the ideal braking force distribution ratio line LIr representing the actual ideal distribution characteristic is represented by a two-dot chain line.

When vehicle braking is started by the start of driver's braking operation or the like while the vehicle is traveling, the brake control device 50 starts the stability control. Then, when the brake device 15 is operated by the stability control, the front-wheel braking force BPf and the rear-wheel braking force BPr are adjusted so that the actual front and rear braking force distribution ratio DR matches the target front and rear braking force distribution ratio DRTr before modification.

Figure 12A:
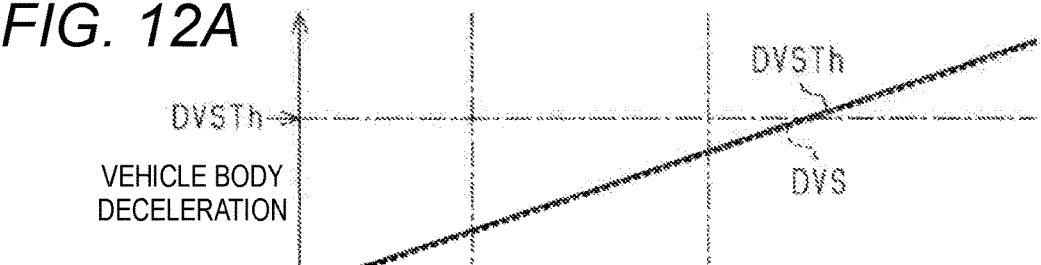
FIGS. 12($a$) to 12($c$) are timing charts when the target front and rear braking force distribution ratio used in the stability control is changed.
Figure 12B:
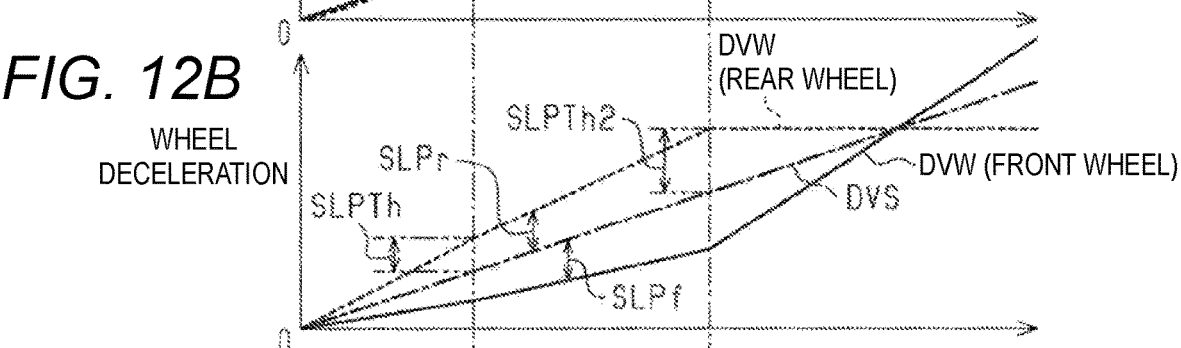
Figure 12C:
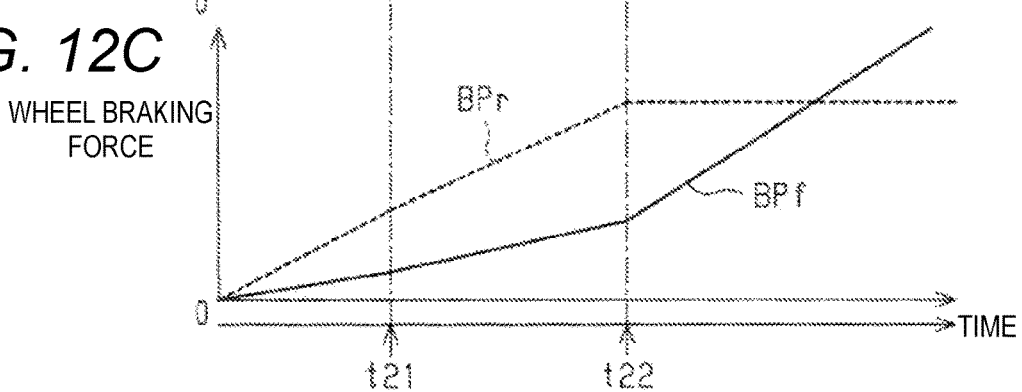

Since the ideal distribution characteristic grasped by the brake control device 50 is deviated from the actual ideal distribution characteristic, as shown in FIGS. 12(a), 12(b), and 12(c), the slip value SLPr of the rear wheels RL, RR becomes larger than or equal to the determination slip value SLPTh even though the slip value SLPf of the front wheels FL, FR is less than the determination slip value SLPTh at timing t21 when the vehicle body deceleration DVS of the vehicle is less than the switching deceleration DVSTh. Then, the target front and rear braking force distribution ratio DRTr is modified so that the increase of the rear-wheel braking force BPr is limited. The broken line in FIG. 11 is a target braking force distribution ratio line LTr representing the characteristic of the relationship between the target front and rear braking force distribution ratio DRTr before modification and the vehicle body deceleration DVS.

Therefore, after timing t21, the front-wheel braking force BPf and the rear-wheel braking force BPr are adjusted based on the target front and rear braking force distribution ratio DRTr after modification. Then, as shown in FIGS. 12(a), 12(b), and 12(c), the slip value SLPr of the rear wheels RL and RR is less likely to increase as the increase amount of the rear-wheel braking force BPr is reduced. That is, as shown by the broken line in FIG. 12(b), the changing speed of the wheel deceleration DVW of the rear wheels RL, RR becomes small. As a result, reduction in the stability of the vehicle behavior while performing the stability control may be prevented.

After timing t21, the increase amount of the front-wheel braking force BPf increases as the increase in the rear-wheel braking force BPr is limited. Therefore, the vehicle body deceleration DVS of the vehicle can be made to follow the target vehicle body deceleration DVSTr in the same manner as before timing t21.

In the example shown in FIG. 12, even if the front-wheel braking force BPf and the rear-wheel braking force BPr are controlled based on the target front and rear braking force distribution ratio DRTr after modification, the slip value SLPr of the rear wheels RL, RR increases as the vehicle body deceleration DVS increases. Then, at timing t22, the slip value SLPr of the rear wheels RL, RR exceeds the specified slip value SLPTh2. As a result, after timing t22, the execution of the stability control is terminated, and the rear-wheel braking holding control for holding the rear-wheel braking force BPr is started. Then, after timing t22, the rear-wheel braking force BPr is not increased even if the target vehicle body deceleration DVSTr is increased. Therefore, the slip value SLPr of the rear wheels RL and RR can be reduced. Therefore, the vehicle can be decelerated while the vehicle behavior is stabilized.

Note that after timing t22, the front-wheel braking force BPf is greatly increased as the rear-wheel braking force BPr is not increased when the target vehicle body deceleration DVSTr is increased. Therefore, the vehicle body deceleration DVS of the vehicle can be made to follow the target vehicle body deceleration DVSTr in the same manner as before timing t22.

In the present embodiment, the following effects can be further obtained.

(1) In the present embodiment, the ideal distribution characteristic is learnt based on the slip value SLPr of the rear wheels RL, RR and the slip value SLPf of the front wheels FL, FR during braking. Therefore, the ratio determination circuit 60 can set the switching deceleration DVSTh to an appropriate value. As a result, the shift of the control from the stability control to the stable control may be performed at an appropriate timing.

(2) In the present embodiment, the target pitch angle PATr is changed between the time of automatic braking of the vehicle and the time of vehicle braking accompanying the driver's braking operation. The driver is likely to feel the deceleration feeling of the vehicle by generating a pitching moment PM in the nose dive direction in the vehicle when the vehicle is decelerating. Therefore, during braking accompanying the braking operation, the target pitch angle PATr is set to a value in the nose dive direction. Therefore, the deceleration feeling of the vehicle can be given to the driver through changes in the orientation of the vehicle. On the other hand, at the time of automatic braking of the vehicle, the target pitch angle PATr is set to suppress the change in the pitch angle PA accompanying the vehicle deceleration. Therefore, the comfortability of the vehicle occupant during the automatic traveling of the vehicle may be improved.

The present embodiment can be modified and implemented as follows. The present embodiment and the following modified examples can be implemented in combination with each other within a technically consistent scope.

The target pitch angle reference value PATrB at the time of automatic braking of the vehicle may be the same as the target pitch angle reference value PATrB during braking accompanying the driver's braking operation. Furthermore, the target pitch angle reference value PATrB at the time of automatic braking of the vehicle may be a value in the nose dive direction of the target pitch angle reference value PATrB during braking accompanying the driver's braking operation.

In the embodiment described above, the pitch angle modification amount $\Delta PA$ used when modifying the target pitch angle reference value PATrB to calculate the target pitch angle PATr is calculated based on the ideal front and rear braking force distribution ratio DRI at the initial stage of braking and the gradient $\theta$ of the road surface on which the vehicle travels. However, if the pitch angle modification amount $\Delta PA$ is calculated based on the ideal front and rear braking force distribution ratio DRI at the initial stage of braking, the gradient $\theta$ of the road surface may not be used for calculating the pitch angle modification amount $\Delta PA$.

Furthermore, if the pitch angle modification amount $\Delta PA$ is calculated based on the gradient $\theta$ of the road surface, the ideal front and rear braking force distribution ratio DRI at the initial stage of braking may not be used.

When calculating the target pitch angle PATr, the ideal front and rear braking force distribution ratio DRI at the initial stage of braking and the gradient $\theta$ of the road surface on which the vehicle travels may not be used.

The target pitch angle PATr may be fixed at a predetermined value set in advance.

As the determination slip value SLPTh, a plurality of values having different sizes may be prepared. For example, of the plurality of determination slip values SLPTh, the smallest value is set as the first determination slip value, and the value larger than the first determination slip value is set as the second determination slip value. Then, when the slip value SLPr of the rear wheels RL, RR becomes larger than or equal to the first determination slip value even though the slip value SLPf of the front wheels FL, FR is less than the first determination slip value under the situation where the stability control is performed, the modification amount $\Delta DR$ may be made equal to the first specified value smaller than "0". Then, the sum of the target front and rear braking force distribution ratio DRTr calculated by the ratio calculation circuit 57 and such a modification amount $\Delta DR$ may be set as the target front and rear braking force distribution ratio DRTr after modification.

Then, when the slip value SLPr of the rear wheels RL, RR becomes larger than or equal to the second determination slip value even though the slip value SLPf of the front wheels FL, FR is less than the second determination slip value under the situation where the front-wheel braking force BPf and the rear-wheel braking force BPr are adjusted based on the target front and rear braking force distribution ratio DRTr after modification, the modification amount $\Delta DR$ may be made equal to the second specified value smaller than the first specified value. Then, the sum of the target front and rear braking force distribution ratio DRTr calculated by the ratio calculation circuit 57 and such a modification amount $\Delta DR$ may be set as the target front and rear braking force distribution ratio DRTr after modification.

That is, during the execution of the stability control, the target front and rear braking force distribution ratio DRTr may be modified in multiple stages in accordance with the increase in the slip value SLPr of the rear wheels RL, RR.

If set to a value of less than or equal to "0", the modification amount $\Delta DR$ used in modifying the target front and rear braking force distribution ratio DRTr may gradually decreases as the slip value SLPr of the rear wheels RL, RR increases. For example, the absolute value of the modification amount ΔDR may be made larger as the slip value SLPr increases by calculating the modification amount ΔDR based on the deviation between the slip value SLPf of the front wheels FL, FR and the slip value SLPr of the rear wheels RL, RR.

In the embodiment described above, the slip value, which is the difference between the wheel deceleration DVW and the vehicle body deceleration DVS, is used as the value that represents the lock tendency of the wheels. However, other values other than the slip value may be adopted as the value representing the lock tendency of the wheels as long as it represents the lock tendency of the wheels. For example, the slip amount, which is the difference obtained by subtracting the wheel speed VW from the vehicle body speed VS, may be adopted as the value representing the lock tendency of the wheels.

In the embodiment described above, if the switching deceleration DVSTh is set to a value corresponding to the vehicle body deceleration when the ideal braking force distribution ratio line LI and the target braking force distribution ratio line LTr intersect, the switching deceleration DVSTh may be a value different from the vehicle body deceleration when the ideal braking force distribution ratio line LI and the target braking force distribution ratio line LTr intersect. For example, a value obtained by subtracting an offset value from the vehicle body deceleration when the ideal braking force distribution ratio line LI and the target braking force distribution ratio line LTr intersect may be set as the switching deceleration DVSTh.

The switching deceleration DVSTh may be fixed at a predetermined deceleration.

The stable control may not cause the front and rear braking force distribution ratio DR to follow the ideal front and rear braking force distribution ratio DRI that is periodically updated by the ideal ratio calculation circuit 59 if the front and rear braking force distribution ratio DR can be made smaller than the target front and rear braking force distribution ratio DRTr before modification. For example, the stable control may be control that increases the front-wheel braking force BPf but does not increase the rear-wheel braking force BPr even if the target vehicle body deceleration DVSTr is increased.

When both the braking force and the driving force are not applied to the vehicle and the vehicle is traveling by inertia, the ground contact load of the wheels can be regarded as equivalent to the sprung load and the spring load, and thus in the embodiment described above, the pre-braking pitch angle PAb is calculated based on the ground contact load FWf of the front wheels FL and FR and the ground contact load FWr of the rear wheels RL and RR. However, this is not the sole case, and the sprung load and the spring load may be calculated, and the pre-braking pitch angle PAb may be calculated based on the calculated sprung load and the spring load under a situation where the vehicle is traveling by inertia.

When calculating the target front and rear braking force distribution ratio DRTr, the pre-braking pitch angle PAb may not be taken into consideration. The pitching during braking can be suppressed similar to the embodiment described above by performing the stability control using the target front and rear braking force distribution ratio DRTr during braking.

The ideal distribution characteristic learning circuit 55 may learn the ideal distribution characteristic through a method different from the learning method described in the above embodiment. For example, the ideal distribution characteristic learning circuit 55 can calculate the vehicle weight based on the motion state of the vehicle while the vehicle is traveling, and can estimate the ideal braking force distribution based on the calculated vehicle weight. In this learning method, the vehicle weight is calculated from the relationship between the driving force at the time of vehicle acceleration and the acceleration of the vehicle, the ground contact load of the front wheels FL, FR and the ground contact load of the rear wheels RL, RR are estimated based on this vehicle weight, and the ideal distribution characteristics are estimated based on the estimated results of the ground contact load of each wheel FL, FR, RL, RR. For example, when the calculated vehicle weight corresponds to the vehicle weight when the occupant is on board, it can be presumed that there is an occupant in the rear portion of the vehicle body, that is, the occupant is seated in the rear seat, and the ground contact load of the rear wheels RL, RR is increased. In this case, the ideal distribution characteristic learning circuit 55 determines that there is a possibility that the front wheels FL, FR may lock before the rear wheels RL, RR, and for example, stores the characteristic that can be represented by the ideal braking force distribution ratio line LI indicated by a solid line in FIG. 5 as ideal distribution characteristic.

The ideal distribution characteristic learning circuit 55 may learn the ideal distribution characteristic through the learning method described in the above embodiment during braking, and the learning method based on the vehicle weight at the time of non-braking of the vehicle. In this case, since the ideal distribution characteristic can be learnt not only during braking but also at the time of vehicle traveling, when the ideal distribution characteristic grasped by the brake control device 50 deviates from the actual ideal distribution characteristic, the deviation can be promptly resolved.

The relationship between the WC pressure Pwc and the braking force applied to the wheels changes due to wear of the rotating body 13 and the friction material 14 that form the braking mechanism 11. Therefore, the brake control device 50 may have a function of modifying the relationship between the WC pressure Pwc and the braking force applied to the wheels. In this case, the target front and rear braking force distribution ratio DRTr based on the target pitch angle PATr may be calculated with reference to the relationship between the WC pressure Pwc and the braking force applied to the wheels modified by the relevant function. Thus, the controllability of the pitch angle PA of the vehicle when performing the stability control can be further enhanced.

Here, an example of a method of modifying the relationship between the WC pressure Pwc and the braking force applied to the wheels will be described. The modification is performed when the pitching moment PM is hardly generated in the vehicle even when the vehicle is braked. That is, when the specified deceleration is set as the target vehicle body deceleration DVSTr, the front-wheel braking force BPf and the rear-wheel braking force BPr are adjusted so that the front and rear braking force distribution ratio DR becomes the first distribution ratio. The vehicle body deceleration DVS of the vehicle at this time is defined as the first vehicle body deceleration.

Furthermore, when the prescribed deceleration is set as the target vehicle body deceleration DVSTr on another occasion, the front-wheel braking force BPf and the rear-wheel braking force BPr are adjusted so that the front and rear braking force distribution ratio DR becomes the second distribution ratio larger than the first distribution ratio. The vehicle body deceleration DVS of the vehicle at this time is defined as the second vehicle body deceleration.

Then, for example, when the second vehicle body deceleration is substantially equal to the prescribed deceleration, and the first vehicle body deceleration is smaller than the second vehicle body deceleration, determination can be made in the braking mechanism 11 for the front wheels FL, FR that the braking force is less likely to increase with respect to an increase in the WC pressure Pwc. Therefore, based on such a determination result, the relationship between the WC pressure Pwc and the front-wheel braking force BPf in the braking mechanism 11 for the front wheels FL and FR is modified.

Moreover, for example, when the first vehicle body deceleration is substantially equal to the prescribed deceleration, and the second vehicle body deceleration is smaller than the first vehicle body deceleration, determination can be made in the braking mechanism 11 for the rear wheels RL, RR that the braking force is less likely to increase with respect to an increase in the WC pressure Pwc. Therefore, based on such a determination result, the relationship between the WC pressure Pwc and the front-wheel braking force BPf in the braking mechanism 11 for the rear wheels RL and RR is modified.

The invention claimed is:

1. A brake control device for a vehicle applied to a brake device configured to adjust a front-wheel braking force that is a braking force applied to a front wheel of the vehicle and a rear-wheel braking force that is a braking force applied to a rear wheel of the vehicle; the brake control device for the vehicle comprising:
   a ratio calculation circuit that calculates a target front and rear braking force distribution ratio that is a target value of a front and rear braking force distribution ratio based on a target pitch angle, the front and rear braking force distribution ratio is a ratio of the rear-wheel braking force with respect to the front-wheel braking force, and the target pitch angle is a target value of a pitch angle of the vehicle during braking; and,
   a brake control circuit that performs a stability control by operating the brake device by using the target front and rear braking force distribution ratio during braking, wherein
      the brake control device includes a pre-braking pitch angle calculation circuit that calculates a pre-braking pitch angle that is a pitch angle during non-braking, from a ground contact load of the front wheel and a ground contact load of the rear wheel, and
      when the target pitch angle to forward is more than pre-braking pitch angle to forward, the ratio calculation circuit increases the distribution ratio of the front-wheel braking force in the target front and rear braking force as a difference between the pre-braking pitch angle and the target pitch angle increases, wherein
   the brake control circuit performs a stable control that lowers the front and rear braking force distribution ratio less than the target front and rear braking force distribution ratio by operating the brake device if the vehicle body deceleration of the vehicle is larger than a switching deceleration during braking, and
   an ideal front and rear braking force distribution ratio that is the front and rear braking force distribution ratio at which the front wheel and the rear wheel are simultaneously locked,
   in a graph in which one of a vertical axis and a horizontal axis indicates the front-wheel braking force and the other indicates the rear-wheel braking force, the switching deceleration is set to a value corresponding to a vehicle body deceleration of the vehicle when a line representing a relationship between the target front and rear braking force distribution ratio and the vehicle body deceleration of the vehicle, and a line representing a relationship between the ideal front and rear braking force distribution ratio and the vehicle body deceleration of the vehicle intersect.

2. The brake control device for the vehicle according to claim 1, wherein
   an anti-dive force that displaces a front portion of the vehicle upward and an anti-lift force that displaces a rear portion of the vehicle downward are generated in the vehicle during braking,
   the anti-dive force is a force whose absolute value increases as the front-wheel braking force increases, and the anti-lift force is a force that increases as the rear-wheel braking force increases, and
   the ratio calculation circuit calculates the target front and rear braking force distribution ratio so that a pitch angle of the vehicle estimated from the anti-dive force and the anti-lift force generated in the vehicle during braking becomes the target pitch angle.

3. The brake control device for the vehicle according to claim 1, further comprising:
   a learning circuit that learns an ideal distribution characteristic that represents the relationship between the ideal front and rear braking force distribution ratio and the vehicle body deceleration of the vehicle during braking; wherein
   the learning circuit learns the ideal distribution characteristic based on a lock tendency of the rear wheels and a lock tendency of the front wheels during vehicle braking.

4. The brake control device for the vehicle according to claim 1, further comprising:
   a learning circuit that learns an ideal distribution characteristic that represents the relationship between the ideal front and rear braking force distribution ratio and the vehicle body deceleration of the vehicle during traveling; wherein
   the learning circuit learns the ideal distribution characteristic based on a vehicle weight obtained based on a motion state of the vehicle during traveling.

5. The brake control device for the vehicle according to claim 1, further comprising, a slip value that is a value representing a degree of slip of the wheel, a ratio modification circuit that modifies the target front and rear braking force distribution ratio so that distribution of the braking force to the rear wheel decreases when the slip value of the front wheel is less than a determination slip value and the slip value of the rear wheel is larger than the determination slip value under a situation where the stability control is performed by the brake control circuit.

6. The brake control device for the vehicle according to claim 1, further comprising a target pitch angle setting circuit that sets the target pitch angle to forward during automatic braking less than the target pitch angle to forward during manual braking.

7. The brake control device for the vehicle according to claim 1, wherein
   the brake control circuit performs a stable control that lowers the front and rear braking force distribution ratio less than the target front and rear braking force distribution ratio by operating the brake device if the vehicle body deceleration of the vehicle is larger than a switching deceleration during braking, and an ideal front and rear braking force distribution ratio that is the front and rear braking force distribution ratio at which the front wheel and the rear wheel are simultaneously locked, in a graph in which one of a vertical axis and a horizontal axis indicates the front-wheel braking force and the other indicates the rear-wheel braking force, the switching deceleration is set to a value corresponding to a vehicle body deceleration of the vehicle when a line representing a relationship between the target front and rear braking force distribution ratio and the vehicle body deceleration of the vehicle, and a line representing a relationship between the ideal front and rear braking force distribution ratio and the vehicle body deceleration of the vehicle intersect.

8. The brake control device for the vehicle according to claim 7, further comprising:

a learning circuit that learns an ideal distribution characteristic that represents the relationship between the ideal front and rear braking force distribution ratio and the vehicle body deceleration of the vehicle during braking; wherein the learning circuit learns the ideal distribution characteristic based on a lock tendency of the rear wheels and a lock tendency of the front wheels during vehicle braking.

9. The brake control device for the vehicle according to claim 7 further comprising:

a learning circuit that learns an ideal distribution characteristic that represents the relationship between the ideal front and rear braking force distribution ratio and the vehicle body deceleration of the vehicle during traveling; wherein the learning circuit learns the ideal distribution characteristic based on a vehicle weight obtained based on a motion state of the vehicle during traveling.

* * * * *